(12) United States Patent
Park et al.

(10) Patent No.: US 10,244,074 B2
(45) Date of Patent: Mar. 26, 2019

(54) METHOD AND APPARATUS FOR RECEIVING PROFILE BY TERMINAL IN MOBILE COMMUNICATION SYSTEM

(71) Applicant: Samsung Electronics Co., Ltd., Suwon-si, Gyeonggi-do (KR)

(72) Inventors: Jonghan Park, Bucheon-si (KR); Duckey Lee, Seoul (KR); Sangsoo Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/967,231

(22) Filed: Apr. 30, 2018

(65) Prior Publication Data

US 2018/0248971 A1   Aug. 30, 2018

Related U.S. Application Data

(63) Continuation of application No. 15/551,888, filed as application No. PCT/KR2016/001619 on Feb. 17, 2016, now Pat. No. 9,961,160.

(30) Foreign Application Priority Data

Feb. 17, 2015  (KR) .................. 10-2015-0024261
Mar. 11, 2015  (KR) .................. 10-2015-0034004

(51) Int. Cl.
*G06K 9/18* (2006.01)
*H04L 9/08* (2006.01)
(Continued)

(52) U.S. Cl.
CPC ............. *H04L 67/303* (2013.01); *G06K 9/18* (2013.01); *H04L 9/08* (2013.01); *H04L 9/32* (2013.01);
(Continued)

(58) Field of Classification Search
CPC ....... H04L 67/303; H04L 67/327; H04L 9/08; H04L 9/32; H04W 8/18; H04W 12/08;
(Continued)

(56) References Cited

U.S. PATENT DOCUMENTS 9,247,424 B2 *  1/2016  Haggerty ............ H04L 63/0853
9,961,160 B2 *  5/2018  Park ...................... H04L 67/303
(Continued)

*Primary Examiner* — Brandon J Miller

(57) ABSTRACT

A method for receiving profile information by a terminal in a communication system according to an embodiment of the present disclosure to solve the above-described problem comprises the steps of: transmitting, to a predetermined server, a first request message including an identifier related to the terminal and information related to a standby server; transmitting, to the standby server, a second request message including identifier information related to the terminal; and receiving, from the standby server, a first response message including server information for profile reception. According to the embodiment of the present disclosure, it is possible to effectively carry out an opening of an eUICC terminal and a device change, and flexibly manage a transfer server for profile download. In addition, it is possible to flexibly install and manage a communication provider's remote installation of a profile in the eUICC terminal.

20 Claims, 27 Drawing Sheets

(51) Int. Cl.
    *H04L 9/32*       (2006.01)
    *H04W 8/18*       (2009.01)
    *H04W 8/20*       (2009.01)
    *H04L 29/08*      (2006.01)
    *H04W 12/06*      (2009.01)
    *H04W 12/08*      (2009.01)
    *H04W 88/02*      (2009.01)

(52) U.S. Cl.
    CPC ............. *H04L 67/327* (2013.01); *H04W 8/18* (2013.01); *H04W 8/20* (2013.01); *H04W 12/06* (2013.01); *H04W 12/08* (2013.01); *H04W 88/02* (2013.01)

(58) Field of Classification Search
    CPC ....... H04W 88/02; H04W 8/20; H04W 12/06; G06K 9/18
    See application file for complete search history.

(56) References Cited

U.S. PATENT DOCUMENTS

| | | | |
|---|---|---|---|
| 2012/0202462 A1* | 8/2012 | Sudhakar | H04M 1/67 |
| | | | 455/411 |
| 2013/0095795 A1* | 4/2013 | Shi | H04L 61/20 |
| | | | 455/411 |
| 2015/0089214 A1* | 3/2015 | Dupre | H04L 63/0853 |
| | | | 713/155 |

* cited by examiner

METHOD AND APPARATUS FOR RECEIVING PROFILE BY TERMINAL IN MOBILE COMMUNICATION SYSTEM

CROSS-REFERENCE TO RELATED APPLICATIONS

This application is a continuation of application Ser. No. 15/551,888, which is the National Stage of International Application No. PCT/KR2016/001619 filed Feb. 17, 2016, which claims priority to Korean Patent Application No. 10-2015-0024261 filed Feb. 17, 2015 and Korean Patent Application No. 10-2015-0034004 filed Mar. 11, 2015, the disclosures of which are fully incorporated herein by reference into the present disclosure as if fully set forth herein.

TECHNICAL FIELD

The present invention relates to a method and apparatus for installing a profile on a terminal in a wireless communication system. In detail, the present invention relates to a communication service implementation method and apparatus of a terminal for providing the communication service in such a way of information being acquired on a server providing profile information and downloading the profile information from the server.

BACKGROUND

A Universal Integrated Circuit Card (UICC) is a smart card designed to be inserted in a mobile communication terminal and to store personal information (such as subscriber authentication information, contacts, and Short Messing Service (SMS) information for subscriber authentication and traffic security key generation processing) for use in attempting access to a mobile communication network such as Global System for Mobile Communication (GSM), Wideband Code Division Multiple Access (WCDMA), and Long Term Evolution (LTE). The UICC contains a Subscriber Identity Module (SIM) application, a Universal SIM (USIM) application, and/or an IP Multimedia SIM (ISIM) application to give access to corresponding types of mobile communication networks, and it provides a high-level security function for supporting various applications such as an electronic wallet, an electronic ticketing, and an electronic passport.

Typically, the UICC is manufactured on demand from a mobile communication operator in the form of an operator-dedicated card storing authentication information (e.g., USIM application, IMSI, and K value) for use in access to the operator's network. Accordingly, the manufactured UICC is delivered to the subscriber via the mobile communication operator and, if necessary, applications are installed, updated, and deleted in the UICC by using a management technology such as Over The Air (OTA). The UICC is designed to be attachable/detachable to/from a mobile communication terminal such that the subscriber can install the UICC in the mobile communication terminal for use of the network and application services of the corresponding mobile communication operator and, when swapping the terminal for another one, easily transfer the authentication information, contact information, and phonebook to the new terminal.

The UICC has a physical shape and a logical function defined by an international standardization organization called the European Telecommunications Standard Institute (ETSI) to maintain global compatibility. With regard to the form factor specifying the physical shape, the UICC is gradually being downsized from the most widely used Mini SIM to the Micro SIM that emerged a few years ago and finally to the recent Nano SIM. Although this contributes greatly to the compact design of mobile communication terminals, there will be no standardization for a UICC smaller in size than the recent Nano SIM because further downsizing of the UICC increases the risk of loss and makes it difficult to form a slot for receiving the excessively small UICC.

Meanwhile, a detachable UICC is not appropriate for Machine-to-Machine (M2M) communication devices (such as an intelligent electronic appliance, an electricity/water meter, and a Closed-Circuit Television (CCTV)), which connect to the mobile communication network without a user's manipulation in various installation environments.

In order to solve the above problems, installation in the manufacturing stage of the mobile communication terminal of a security module responsible for the functions of the legacy detachable UICC may be considered. However, this approach has drawbacks in that the security module embedded in a terminal without operator-specific authentication information (in so far as it is not dedicated to a specific mobile communication operator) allows only the user subscribed to a mobile communication operator to configure the authentication information (USIM application, IMSI, and K value) for use in the corresponding mobile communication network.

Also, unlike the legacy UICC, which is manufactured and distributed for a specific mobile communication operator, the newly introduced embedded security module has to meet requirements for allowing the user who has purchased the terminal to install and maintain the authentication information of various mobile communication operators securely and flexibly in the course of subscribing and unsubscribing to a specific mobile communication operator or switching the subscription between operators.

SUMMARY

The present invention aims to provide a method and apparatus for installing and managing a profile (including a subscriber identifier and an encryption key (K)) of a communication operator remotely and flexibly in a terminal with an embedded UICC (eUICC) for subscription to the services of the mobile communication operator.

Also, the present invention aims to provide a method and apparatus for transmitting/receiving a profile of a wireless communication system.

Also, the present invention aims to provide a method and apparatus for registering a terminal equipped with an eUICC with a mobile communication operator using a mobile communication operator's console at an office of an agent of the mobile communication operator.

Also, the present invention aims to provide a method and apparatus for allowing a user to register a terminal equipped with an eUICC with a mobile communication operator using the terminal.

In accordance with an aspect of the present invention, a profile information reception method of a terminal in a communication system includes transmitting a first request message including a terminal-related identifier and preliminary server-related information to a predetermined server, transmitting a second request message including the terminal-related identifier to the preliminary server, and receiving a first response message including server information for receiving a profile from the preliminary server.

In accordance with another aspect of the present invention, a terminal for receiving profile information in a communication system includes a transceiver which transmits and receives signals and a controller which controls the transceiver to transmit a first request message including a terminal-related identifier and preliminary server-related information to a predetermined server, transmit a second request message including the terminal-related identifier to the preliminary server, and receive a first response message including server information for receiving a profile from the preliminary server.

The communication service implementation method and apparatus of the present invention is advantageous in terms of facilitating registration of an eUICC terminal with an operator and switching a subscription between operators. Also, the communication service implementation method and apparatus of the present invention is advantageous in terms of installment and management of a profile in the eUICC terminal in a remote and flexible manner.

DETAILED DESCRIPTION

Figure 1:
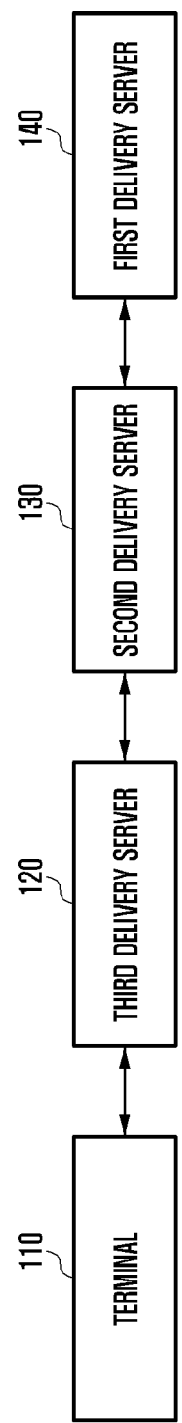
FIG. 1 is a diagram illustrating a wireless communication system for remote download of a profile according to an embodiment of the present invention.

Exemplary embodiments of the present invention are described in detail with reference to the accompanying drawings.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Detailed descriptions of well-known functions and structures incorporated herein may be omitted to avoid obscuring the subject matter of the present invention. Exemplary embodiments of the present invention are described in detail with reference to the accompanying drawings.

First, terms herein are defined. The terms are defined for a person skilled in the art, but descriptions will be made thereof in detail, if necessary to help understand operations and properties related to the present invention.

It should be noted that the eUICC is characterized by being fixed in a terminal, but the term "eUICC" is used as a concept including the legacy detachable eUICC that is equivalent in functionality to the eUICC.

In the present invention, the UICC is a smart card or a chip card designed to be inserted in a mobile communication terminal and to store personal information (such as subscriber authentication information, contacts, and Short Messing Service (SMS) information for subscriber authentication and traffic security key generation processing) for use in attempting access to a mobile communication network such as GSM, WCDMA, and LTE. The UICC contains a SIM application, a Universal SIM(USIM) application, and/or an ISIM application to give access to corresponding types of mobile communication networks, and it provides a high-level security function for supporting various applications such as an electronic wallet, an electronic ticketing, and an electronic passport.

Although the description is directed to the eUICC as a security module in the form of a chip fixed in a terminal, the embodiments of the present invention can be applicable to the legacy UICC, which is identical with the eUICC functionally, electrically, and in terms of software characteristics. The embodiments of the present invention may be applicable for the operation of an eUICC manufactured in the form of a UICC. The eUICC is designed to install a profile downloaded through a cellular network or an Internet Protocol (IP) network such as Wireless Fidelity (Wi-Fi). The embodiments of the present invention may be applied regardless of the type of network through which the profile is downloaded.

In the following description, the term "profile" may denote a software package of at least one of an application, a file system, and an authentication value being stored in the UICC.

In the following description, the term "USIM profile" is used with the same meaning as profile or refers to the information contained in the USIM application of the profile in the form of a software package.

In the following description, the terms "first delivery server", "first Subscription Manager Data Preparation (SMDP)", "first off-card entity of Profile Domain", "first profile encryption server", "first profile generation server", and "first Profile Provisioner or Profile Provider" are used interchangeably.

In the following description, the terms "second delivery server", "second SM-DP", "second off-card entity of Profile Domain, "second profile encryption server", "second profile generation server", and "second Profile Provisioner or Profile Provider" are used interchangeably. Depending on the case, the first and second delivery servers may be implemented as a single server and, in this case, the server may be referred to as first/second delivery server, first/second SM-DP, first/second off-card entity of Profile Domain, first/second profile generation server, and first/second Profile Provisioner or Profile Provider.

In the following description, the terms "third delivery server", "third profile management server", "third SM-SR", "third off-card entity of eUICC Profile Manager", and "Profile Manager are used interchangeably. Depending on the case, the first to third delivery servers may be implanted as a single server and, in this case, the corresponding server may be interchangeably referred to as a delivery server, delivery platform and an SM server.

In the following description, the term "terminal" may be interchangeably referred to as a mobile station(MS),User Equipment (UE), User Terminal (UT), radio terminal, Access Terminal (AT), terminal, Subscriber Unit, Subscriber Station (SS), wireless device, wireless communication device, Wireless Transmit/Receive Unit (WTRU), mobile node, mobile, and the like. In various embodiments, examples of the terminal may include a cellular phone, a wireless communication function-enabled smartphone, a wireless communication function-enabled Personal Digital Assistant (PDA), a wireless modem, a wireless communication function-enabled portable computer, a wireless communication function-enabled image capture device such as a digital camera, a wireless communication function-enabled gaming device, a wireless communication function enabled-music storage and playback device, a wireless Internet access and browsing-enabled device, and a portable unit or terminal in the form of any combination of the aforementioned devices. A communication function-enabled meter may be included as an example of the terminal.

Although the description is directed to a Machine-to-Machine (M2M) terminal or Machine Type Communication (MTC) terminal/device, the present invention is not limited thereto.

In the following description, a profile identifier may be referred to as a factor matching a profile ID, Integrated Circuit Card ID (ICCID), and Issuer Security Domain-Profile (ISD-P). The profile ID may be a unique identifier of a profile. In the following description, an eUICC identifier may be a unique identifier of the eUICC of a terminal and referred to as an eUICC ID (ED). The profile identifier may also be used to identify the profile in the network.

FIG. 1 is a diagram illustrating a wireless communication system for remote download of a profile according to an embodiment of the present invention.

In reference to FIG. 1, the communication system may include at least one of a terminal 110, a third delivery server 120, a second delivery server 130, and a first delivery server 140.

In detail, the communication system may include the terminal 110 which connects to a wireless communication network, the third delivery server 120 for delivering a profile to the terminal 110, the first delivery server 140 for generating and encrypting the profile, and the second deliver server 130 for relaying the profile from the first delivery server 140 to the third delivery server 120 and protecting against reinstallation of the profile.

In an embodiment, the profile may include an encryption key (e.g., K) for authenticating the subscriber identity (e.g., International Mobile Subscriber Identity (IMSI)) and information on the communication service provided by the corresponding operator.

In an embodiment, the terminal may communicate signals with the third delivery server 120 and receive information related to the profile.

Figure 2:
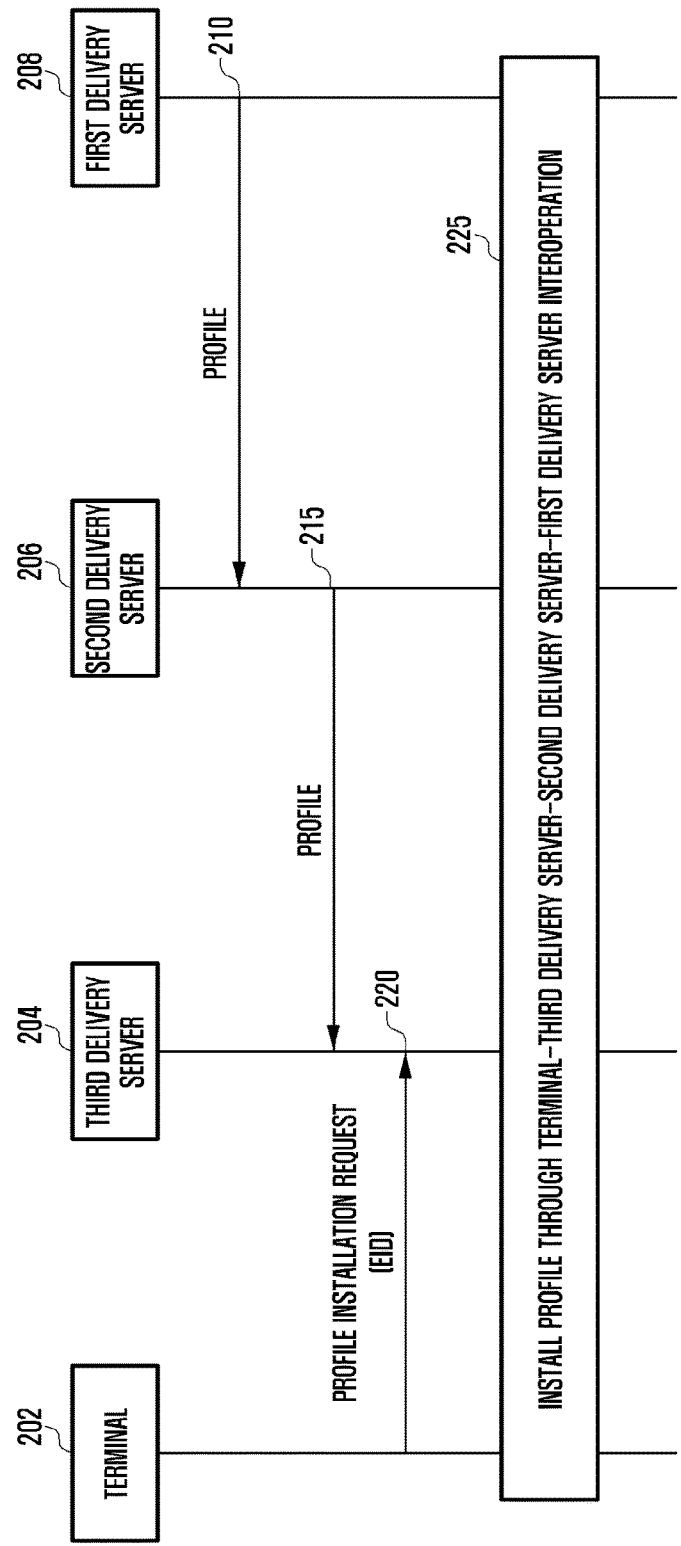
FIG. 2 is a signal flow diagram illustrating a procedure for remote profile download according to an embodiment of the present invention.

FIG. 2 is a signal flow diagram illustrating a procedure for remote profile download according to an embodiment of the present invention.

In reference to FIG. 2, a terminal 202 may receive profile information through at least one of a third delivery server 204, a second delivery server 206, and a first delivery server 202.

In detail, the first delivery server 208 may generate and encrypt a profile and send the profile to the second delivery server 206 at step 210.

The second delivery server 206 may send the encrypted profile to the third delivery server 204 at step 215.

The terminal 202 may send a profile installation request including an eUICC identifier (EID) to the third delivery server 204 at step 220. In detail, the terminal 202 may transmit to the third delivery server 204 the profile installation request including the EID as a factor.

Afterward, the terminal 202 may download the profile through interoperation among the terminal 202, the third delivery server 204, the second delivery serve 206, and the first delivery server 208 at step 225.

Figure 3:
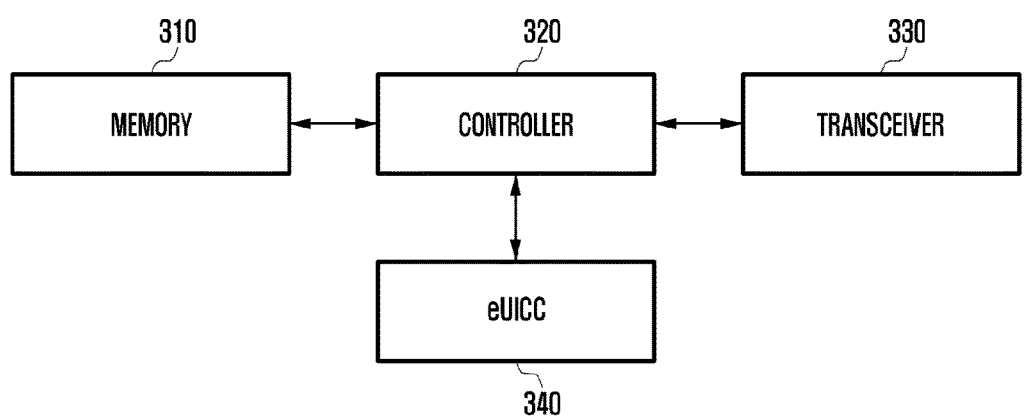
FIG. 3 is a block diagram illustrating a configuration of a terminal according to an embodiment of the present invention.

FIG. 3 is a block diagram illustrating a configuration of a terminal according to an embodiment of the present invention.

In the embodiment of FIG. 3, the terminal may include a transceiver 330 for data communication through a wireless network, an eUICC 340, a controller 320 for controlling installation of the profile received through a connection established with the third delivery server, and a storage unit 310 for storing data input through the transceiver 330 and processing results of the controller 320. The controller 320 may include at least one processor and control the overall operations of the terminal in a embodiment of the present application.

Figure 4:
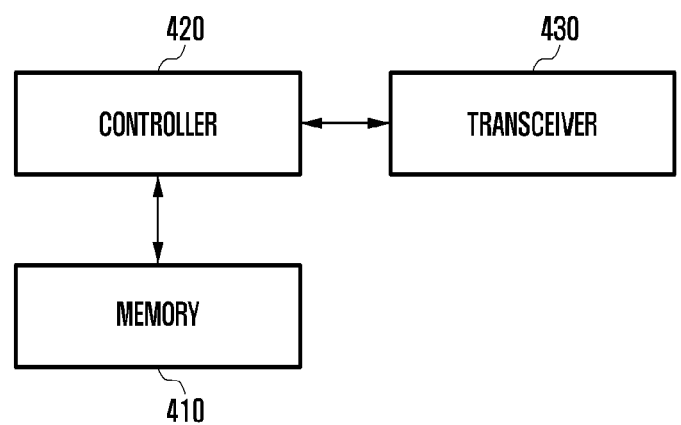
FIG. 4 is a block diagram illustrating a configuration of a first delivery server according to an embodiment of the present invention.

FIG. 4 is a block diagram illustrating a configuration of a first delivery server according to an embodiment of the present invention.

In the embodiment of FIG. 4, the first delivery server may include a transceiver 430 for communication with another entity such as the second delivery server, a controller 420 for performing profile encryption, and a storage unit 410 for storing the encrypted profile. The controller 420 may include at least one processor and control overall operations of the first delivery server.

Figure 5:
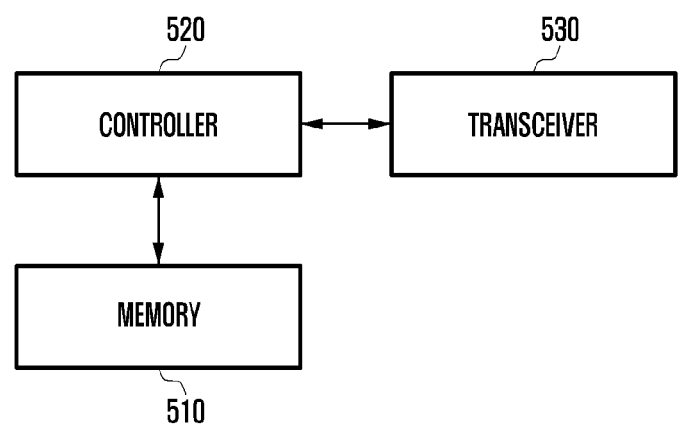
FIG. 5 is a block diagram illustrating a configuration of a second delivery server according to an embodiment of the present invention.

FIG. 5 is a block diagram illustrating a configuration of a second delivery server according to an embodiment of the present invention.

In the embodiment of FIG. 5, the second delivery server may include a transceiver 530 for communication with another entity such as the first and third delivery servers, a controller 520 for controlling profile reinstallation, and a storage unit 510 for storing data input through the transceiver 530 and processing results of the controller 520. The controller 520 may include at least one processor and control overall operations of the second delivery server.

Figure 6:
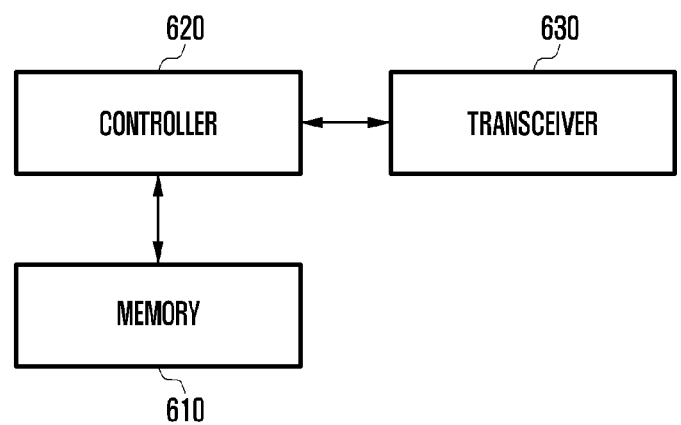
FIG. 6 is a diagram illustrating a configuration of a third delivery server according to an embodiment of the present invention.

FIG. 6 is a diagram illustrating a configuration of a third delivery server according to an embodiment of the present invention.

In the embodiment of FIG. 6, the third delivery server may include a transceiver 630 for communication with another entity such as the terminal and second delivery server in the communication system, a controller 620 for performing authentication and authorization during the profile installation, and a storage 610 for storing data input through the transceiver 630 and processing results of the controller 620. The controller 620 may include at least one processor and control overall operations of the third delivery server.

Figure 7:
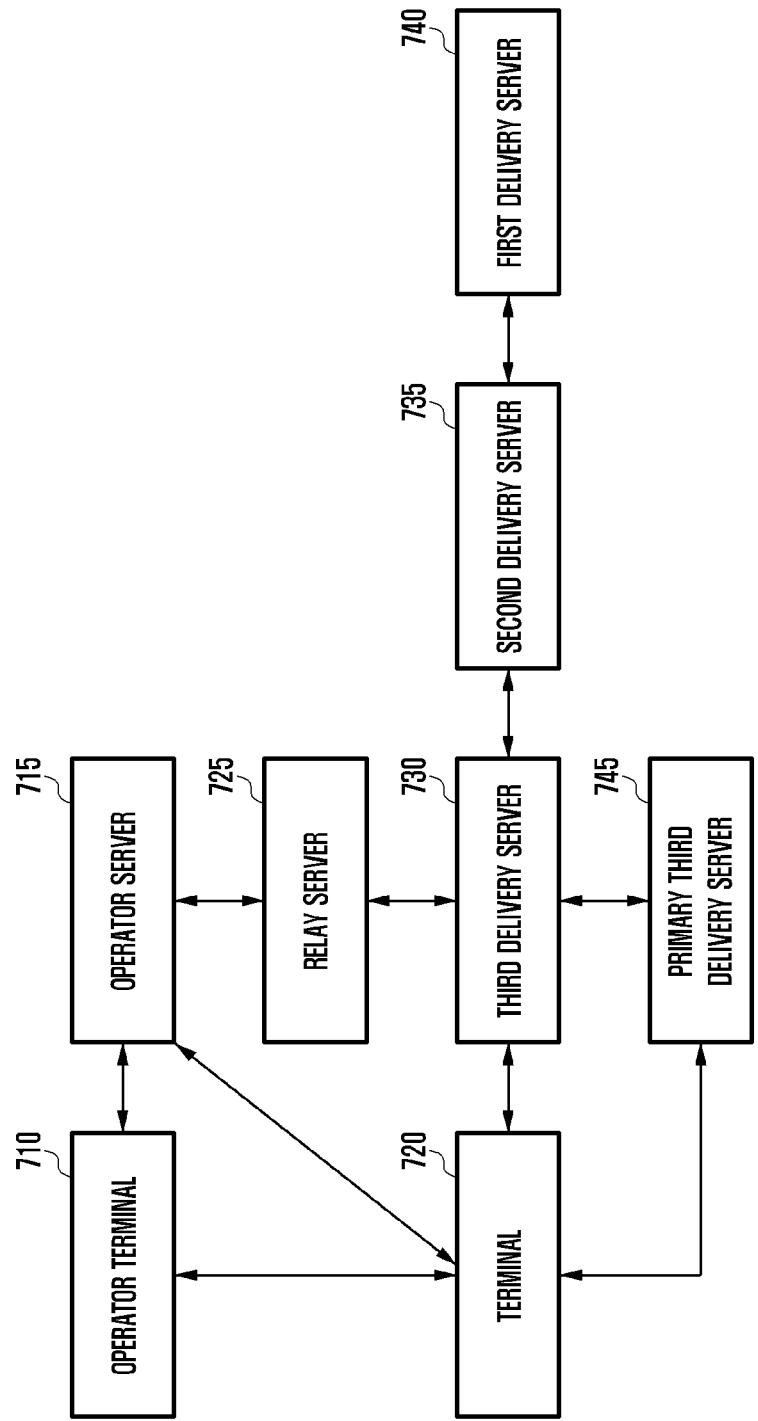
FIG. 7 is a block diagram illustrating a wireless communication system for remote download of a profile according to another embodiment of the present invention.

FIG. 7 is a block diagram illustrating a wireless communication system for remote download of a profile according to another embodiment of the present invention.

In reference to FIG. 7, the wireless communication system includes an operator terminal 710, an operator server 715, a terminal 720, a relay server 725, a third delivery server 730, a second delivery server 735, a first delivery server 740, and a Primary third delivery server 745, one of which communicates data with another entity. In detail, the operator terminal 710, the operator server 715, the relay server 725, and the Primary third delivery server 745 are further added to the system to support profile download of the terminal 720.

In this embodiment, the operator terminal 710 may connect to the operator server 715 and transmit at least one of terminal information, contract code, terminal-specific profile ID, and Primary third delivery server address to the operator server 715, the terminal information, contract code, terminal-specific profile ID, and Primary third delivery server address being received from the terminal 720. In detail, the operator terminal 710 may be a terminal for use by the operator managing the operator server 715 or a terminal stationed in an office of an agent under the management of the operator managing the operator server 715. In this embodiment, the contract code may be stored in the terminal 720 and determined through a contract with the operator. The contract code may include the information related to the operator server address. The profile ID may be an identifier for identifying the profile to be downloaded by the terminal 720.

The operator server 715 may be a server of the communication network operator and transmit at least one of the terminal information, contract code, terminal-specific profile ID, and Primary third delivery server address to the relay server 725, the at least one of the terminal information, contract code, terminal-specific profile ID, and Primary third delivery server address being received from the operator terminal 710 or the terminal 720. According to an embodiment of the present invention, the operator server 715 may determine that the relay server 725 relays information based on the at least one of the received information and communicates signals with the relay server 725.

The third delivery server 730 may transmit the profile to the terminal 720 through signal communication with the terminal 720. The third delivery server 730 may communicate signals with the Primary third delivery server 745 based on at least one of the information received from the relay server 725. In detail, the third delivery server 730 may transmit the information on the address of the third delivery server 730 to the Primary third delivery server 745 based on the received information.

The Primary third delivery server 745 may communicate signals with at least one of the terminal 720 and the third delivery server 730, receive the information on the third delivery server address from the third delivery server 730, and transmit, when a request message including a terminal identifier or a profile ID is received from the terminal 720, the information on the address of the third delivery server 730 to the terminal 720.

A description is made hereinafter of the profile download procedure with reference to FIGS. 8A and 8B.

Figure 8A:
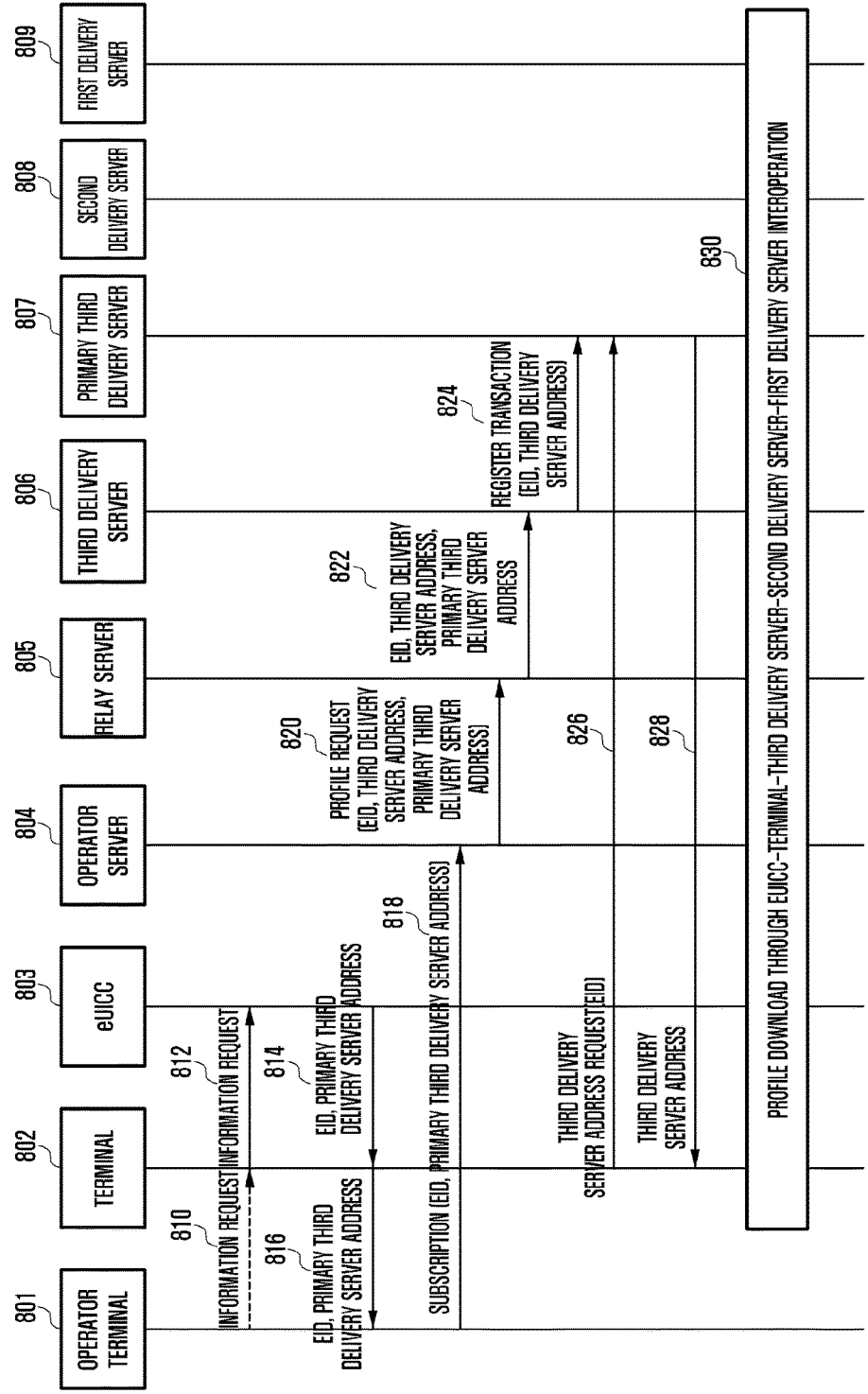
FIGS. 8A and 8B are signal flow diagrams illustrating remote profile download procedures according to an embodiment of the present invention.

FIG. 8A is a signal flow diagram illustrating a remote profile download procedure of a terminal according to an embodiment of the present invention, the procedure being characterized in that the terminal equipped with an eUICC downloads the profile via an operator terminal stationed in an office of an agent under the management of the operator.

In reference to FIG. 8A, at least one of an operator terminal 801, a terminal 802, an eUICC 803, an operator server 804, a relay server 805, a third delivery server 806, a Primary third delivery server 807, a second delivery server 808, and a first delivery server 809 may communicate signals with another entity. In an embodiment, the eUICC 803 may be installed in the terminal 802, and a controller of the terminal 802 may request to the eUICC 803 for information and receive the corresponding information.

In an embodiment, each of the third delivery server 806, the second delivery server 808, and the first delivery server 809 may be comprised of at least one server or entity. According to an embodiment, the at least one server or entity may be an SM-DP+ server.

According to an embodiment, at least one of the first to third delivery servers 806, 808, and 809 may encrypt profile or information for use in downloading the profile.

According to an embodiment, at least one of the first to third delivery servers 806, 808, and 809 may perform a user authentication procedure for the terminal to download the profile.

According to an embodiment, the Primary third delivery server 807 may be an SM-DS server.

The operator terminal 801 may acquire at least one of the EID corresponding to the terminal 802 and the Primary third delivery server address through steps 810 to 816. The at least one of the EID and Primary third delivery server address may be stored in the terminal 802 or the eUICC 803.

The operator terminal 801 may transmit an information request to the terminal 802 at step 810. The information request may include an enquiry about at least one EID of the terminal 802 and the third delivery server address.

The terminal 802 may transmit the information request to the eUICC 803 at step 812.

The eUICC 803 may transmit at least one of the EID and Primary third delivery server address to the terminal 802 at step 814.

The terminal 802 may transmit the at least one of the EID and Primary third delivery server address to the operator terminal 801 at step 816.

Throughout this embodiment, the EID and Primary third delivery server address may be a value corresponding to the terminal 802 or the eUICC 803.

According to an embodiment, the process for the operator terminal 801 to acquire the at least one of the EID and Primary third delivery server address through steps 810 to 816 may be elaborated as follows. Throughout this embodiment, a display device or a display unit may display the information on the operation of a system.

Enter an EID and a Primary third delivery server address printed on the outside of the terminal 802 or a box into the operator terminal 801 by means of an input unit.

Enter at least one of the EID and Primary third delivery server address into the operator terminal 801 by means of an input unit, the at least one of the EID and Primary third delivery server address being provided by the UICC 803 in response to the enquiry made by means of the terminal 802 and displayed on the display unit of the terminal 803.

Enter the EID and Primary third delivery server address into the operator terminal 801 by means of an input unit, the EID being provided by the eUICC 803 in response to the enquiry made by means of the terminal 802 and displayed on the display unit along with the Primary third delivery server address stored in the terminal 802 in the manufacturing stage.

According to an embodiment, the information may be input to the operator terminal 801 by a user or through information exchange between the operator terminal 801 and the terminal 802.

The input unit of the operator terminal 801 may be a camera or a scanner, and the EID and Primary third delivery server address may be printed on the box of the terminal 802 or the eUICC 803 in the form of a Quick Response (QR) code or displayed on the display unit.

The operator terminal 801 may transmit subscription information of the terminal 802 to the operator server 804 based on one of the EID and Primary third delivery server address at step 818. In detail, the operator terminal 801 may transmit the subscription information of the terminal 802 to the operator server 804 through a connection pre-established with the operator server 804. The subscription information includes at least one of the EID and Primary third delivery server address. The subscription information may further include a profile ID and contract code downloaded to the terminal 802.

The operator server 804 may process the communication service subscription based on the subscription information received from the operator terminal 801 and transmit a profile provision request including at least part of the subscription information and the third delivery server address to the relay server 805 at step 820. For example, the operator server 804 may transmit to the relay server 805 the profile provision request including at least one of the EID, Primary third delivery server address, and third delivery server address. The third delivery server address may be the address of the third delivery server 806 to which the terminal 802 has to establish a connection for downloading the profile.

The relay server 805 may transmit to the third delivery server 806 the information including at least part of the profile provision request received from the operator server 804 at step 822. For example, the relay server 805 may transmit to the third delivery server 806 at least one of the EID, third delivery server address, and Primary third delivery server address.

The relay server 805 may transmit to the Primary third delivery server 807 at step 824 a transaction registration request including at least part of the information received from the relay server 805. If the transaction registration request is received from the third delivery server 806, the Primary third delivery server 807 may map the EID and the third delivery server address conveyed in the transaction registration request and store the mapping in the storage unit. According to an embodiment, the third delivery server address may be mapped to at least part of the information included in the transaction registration request as well as the EID or a value preconfigured in the third delivery server 806.

Although not shown in the drawing, the Primary third delivery server 807 may notify the terminal 802 afterward that the registration has been completed. For example, the Primary third delivery server 807 may make a registration completion notification to the terminal 802 through an Mobile Network Operator (MNO) server.

The terminal 802 may transmit a third delivery server request to the Primary third delivery server 807 at step 826. For example, the terminal 802 may establish a connection with the Primary third delivery server 807 based on the Primary third delivery server address set therein and transmit the third delivery server address request message to the Primary third delivery server 807. The third delivery server address request message may include the EID.

At step 828, the Primary third delivery server 807 may transmit to the terminal 802 a message including the third delivery server address based on at least part of the information received at steps 824 and 826. For example, the Primary third delivery server 807 may check the ED-third delivery server address mapping information stored in a storage unit to retrieve the third delivery server address mapped to the EID and transmit the third delivery server address to the terminal 802.

At step 830, the terminal 802 may establish a connection with the third delivery server 806 with the third delivery server address received from the terminal 802 to download the profile through interoperation with the third delivery server 806.

According to an embodiment, the third delivery server 806 may be integrated into the Primary third delivery server 807 and, in this case, the Primary third delivery server 807 may trigger the profile download immediately without transmitting the third delivery server address to the terminal 802.

Figure 8B:
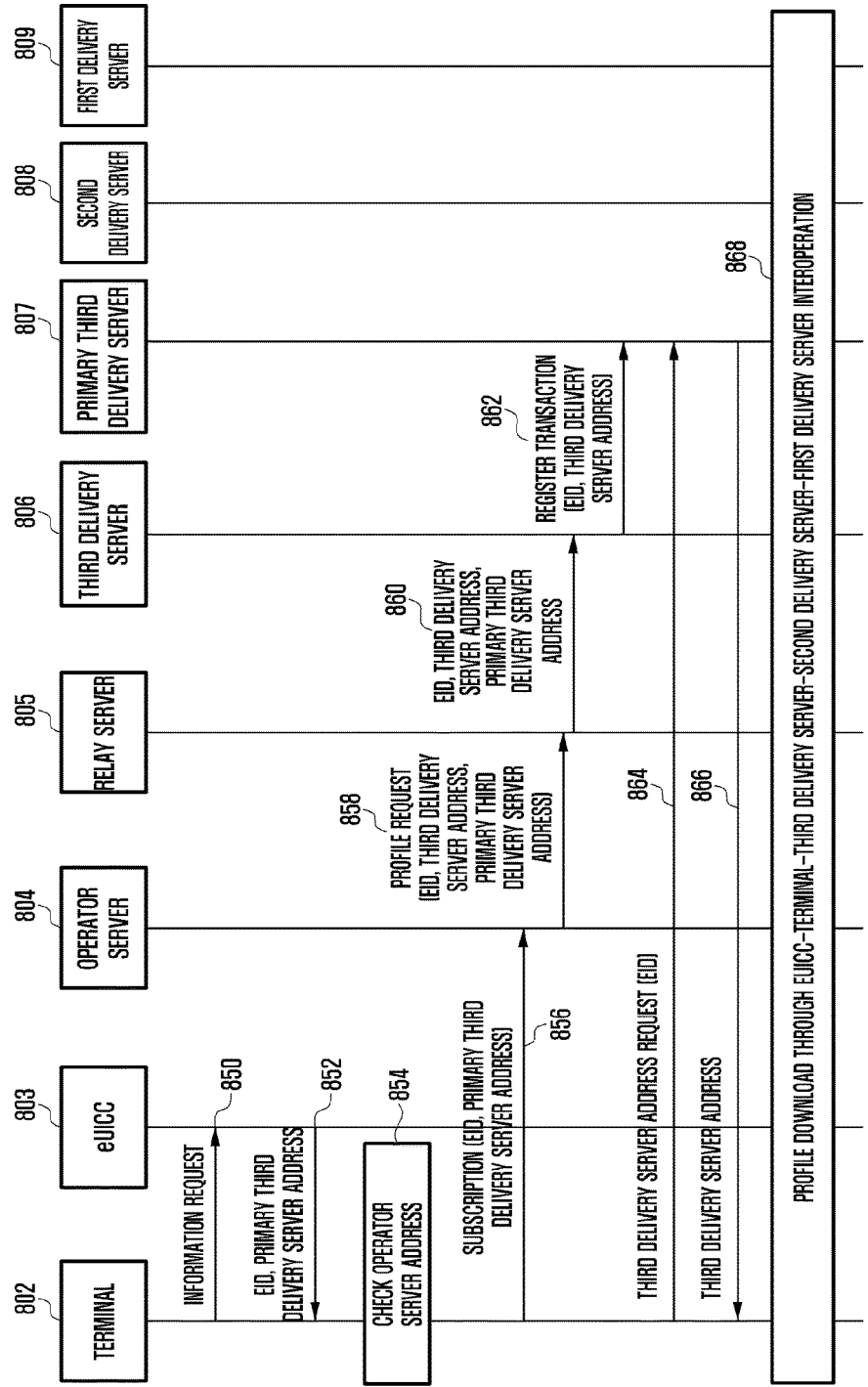

FIG. 8B is a signal flow diagram illustrating a remote profile download procedure of a terminal according to another embodiment of the present invention, the procedure characterized by the operator terminal not being needed.

In reference to FIG. 8B, at least one of a terminal 802, an eUICC 803, an operator server 804, a relay server 805, a third delivery server 806, a primary third delivery server 807, a second delivery server 808, and a first delivery server 809 may communicate with another entity. According to an embodiment, the eUICC 803 may be installed in the terminal 802, and a controller of the terminal 802 may request to the eUICC 803 for information and receive corresponding information.

The terminal 802 may acquire at least one of an EID and a Primary third delivery server address from the eUICC 803 at step 852. The terminal 802 may further acquire a contract code related to the contract with the operator.

The terminal 802 may establish a connection with the operator server 804. The terminal 802 may check for the operator server address at step 854. The terminal 802 may check for the operator server address according to at least one of the following methods.

The terminal 802 transmits an operator identifier (e.g., Public Land Mobile Network (PLMN) ID) to the Primary third delivery server 807 or the third delivery server 806 and receives the operator server address from the Primary third delivery server 807 or the third delivery server 806.

The operator server address acquisition method uses contract code information provided by the operator. The contract code information may include the operator server address information, which makes it is possible to acquire the operator server address by entering the contract code into the terminal 802 with an input unit. Alternately, the contract code information may include an operator identifier (e.g., PLMN ID or combination of MCC and MNC), and the terminal stores the PLMN ID-operator server address mapping; thus, it is possible to retrieve the operator server address corresponding to the PLMN ID included in the contract code input.

The input unit of the terminal 802 may be a touchscreen or a camera for scanning a QR code containing the contract code information.

The terminal 802 transmits to the operator server 804 the subscription information including at least one of the EID and Primary third delivery server address at step 856. The subscription information may include the contract code information and, according to an embodiment, the operator server 804 may verify the validity of the contract code.

Although not shown in the drawing, instead of steps 854 and 856, it may be possible for the terminal to transmit the EID and subscription information to the Primary third delivery server address stored in the terminal such that the Primary third delivery server extracts the operator information from the subscription information and establishes a connection with the operator server 804 on behalf of the terminal 802 to transmit the EID and subscription information.

The operator server 804 may process the communication service subscription based on at least part of the subscription information received from the terminal 802 or the Primary third delivery server and, at step 858, transmit to the relay server 805 at least one of part of the information received at step 856 and the Primary third delivery server address. For example, the operator server 804 transmits to the delivery server 805 a profile request including at least one of the EID, Primary third delivery server address, and third delivery server address received from the terminal 802. The third delivery server address may be the address of the third delivery server with which the terminal 802 establishes a connection for downloading the profile.

At step 860, the relay server 805 may transmit to the third delivery server 806 at least part of the information received from the operator server 804. For example, the delivery server 805 may transmit to the third delivery server 806 at least one of the EID, third delivery server address, and Primary third delivery server address received from the operator server 804.

The third delivery server 806 may, at step 862, transmit to the Primary third delivery server 807 a transaction registration request including at least part of the information received from the relay server 805. If the transaction registration request including at least one of the EID and third delivery server address is received from the third delivery server 806, the Primary third delivery server 807 may map the EID and the third delivery server address and store the mapping information in a storage unit. According to an embodiment, the third delivery server address may be mapped to at least part of the information included in the transaction registration request or a value set in the third delivery server 807 in addition to the EID.

The terminal 802 may establish a connection with the Primary third delivery server 807 based on the Primary third delivery server address set in the terminal 802 and, at step 864, transmit a third delivery server address request message to the Primary third delivery server 807 along with the EID.

At step 866, the Primary third delivery server 807 may transmit to the terminal 802 the third delivery server address corresponding to the EID received from the terminal 802 based on the ED-third delivery server address mapping information.

At step 868, the terminal 802 may establish a connection with the third delivery server 806 based on the third delivery server address received from the terminal 802 to download the profile through interoperation with the third delivery server 806.

According to an embodiment, the relay server 805 and the third delivery server 806 may be implemented as physically separated nodes or as a single node but separated logically. The relay server 805 and the third delivery server 806 may reside on the same server.

According to an embodiment, the system may include multiple third delivery servers 806 of the operator. In this case, one of the multiple third delivery servers is designated as the Primary third delivery server 807.

Although the description is directed to the case where the terminal 802 connects to the operator server 804 directly or via the operator terminal 801, it may also be possible for the terminal 802 to communicate signals with the operator server 804 via the Primary third delivery server 807. In detail, the terminal 802 may directly transmit a profile request message to the Primary third delivery server 807.

Figure 9:
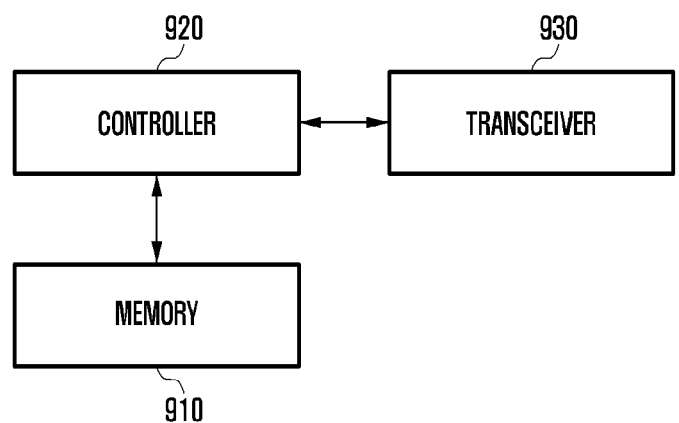
FIG. 9 is a block diagram illustrating a configuration of a Primary third delivery server according to another embodiment of the present invention.

FIG. 9 is a block diagram illustrating a configuration of a Primary third delivery server according to another embodiment of the present invention.

In the embodiment of FIG. 9, the Primary third delivery server may include at least one of a transceiver 930 for communication with a third delivery server and a terminal, a controller 920 for mapping an eUICC identifier and a third delivery server address received from the third delivery server and control transmitting the eUICC identifier to the Primary third delivery server in response to a third delivery server address request including the eUICC identifier which is transmitted by the terminal, and a storage unit 910 for storing the data input through the transceiver 930 and processing results of the controller 920. The controller 920 may include at least one processor and control overall operations of the Primary third delivery server.

Figure 10:
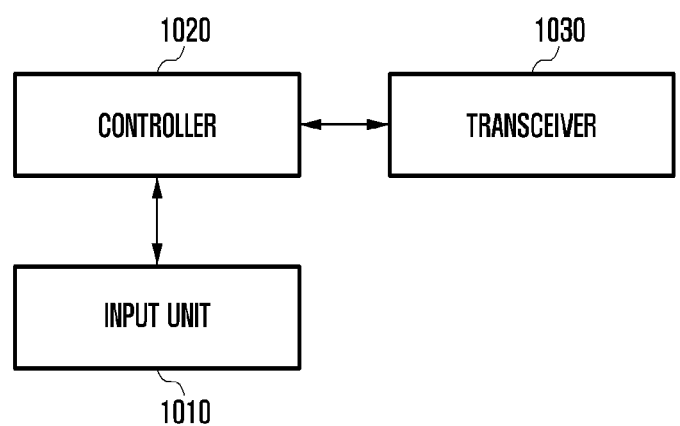
FIG. 10 is a block diagram illustrating a configuration of an operator terminal according to another embodiment of the present invention.

FIG. 10 is a block diagram illustrating a configuration of an operator terminal according to another embodiment of the present invention.

In the embodiment of FIG. 10, the operator terminal may include at least one of an input unit 1010 for receiving input of an eUICC identifier and a Primary third delivery server address, a transceiver 1030 for transmitting the eUICC identifier and the Primary third delivery server address to an operator server, and a controller 1020 for controlling operations of the operator terminal. The controller 1020 may include at least one processor and control the overall operations of the operator terminal.

Figure 11:
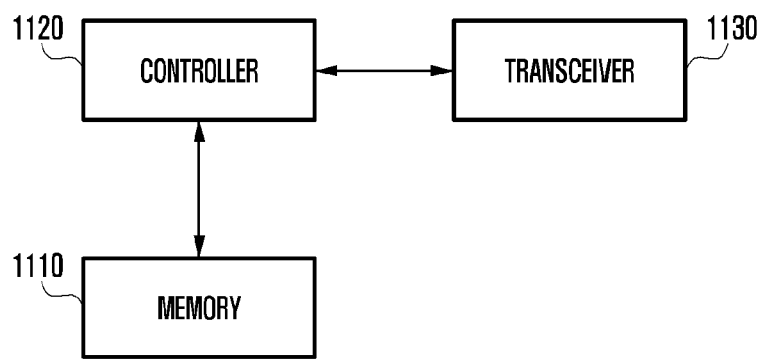
FIG. 11 is a block diagram illustrating a configuration of an operator server according to another embodiment of the present invention.

FIG. 11 is a block diagram illustrating a configuration of an operator server according to another embodiment of the present invention.

In the embodiment of FIG. 11, the operator server may include at least one of a transceiver 1130 for communication with an operator terminal and a relay server; a controller 1120 for controlling the transceiver 1130 to transmit the eUICC identifier, third delivery server address, and Primary third delivery server address received from at least one of an operator terminal and a user terminal; and a storage unit 1130 for storing data input through the transceiver 1130 and processing results of the controller 1120. The controller 1120 may include at least one processor and control the overall operations of the operator server.

Figure 12:
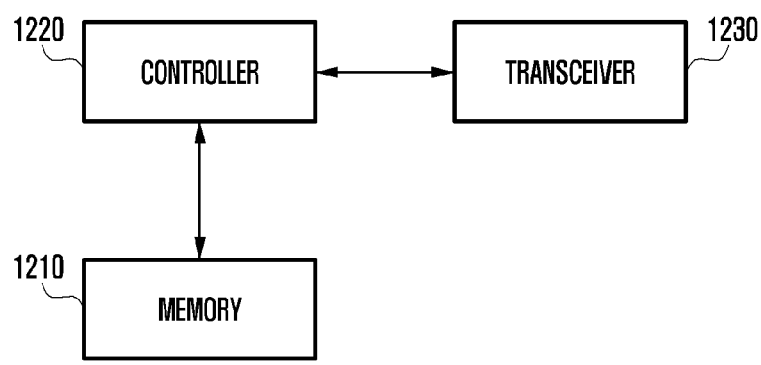
FIG. 12 is a block diagram illustrating a configuration of a relay server according to another embodiment of the present invention.

FIG. 12 is a block diagram illustrating a configuration of a relay server according to another embodiment of the present invention.

In the embodiment of the present invention, the relay server may include a transceiver 1230 for communication with an operator server and a third delivery server; a controller 1220 for controlling the transceiver to transmit an eUICC identifier, a third delivery server address, and a Primary third delivery server address received from the operator server; and a storage unit 1210 for storing information related to the operations of the relay server. The controller 1220 may include at least one processor and control the operations of the relay server.

Figure 13:
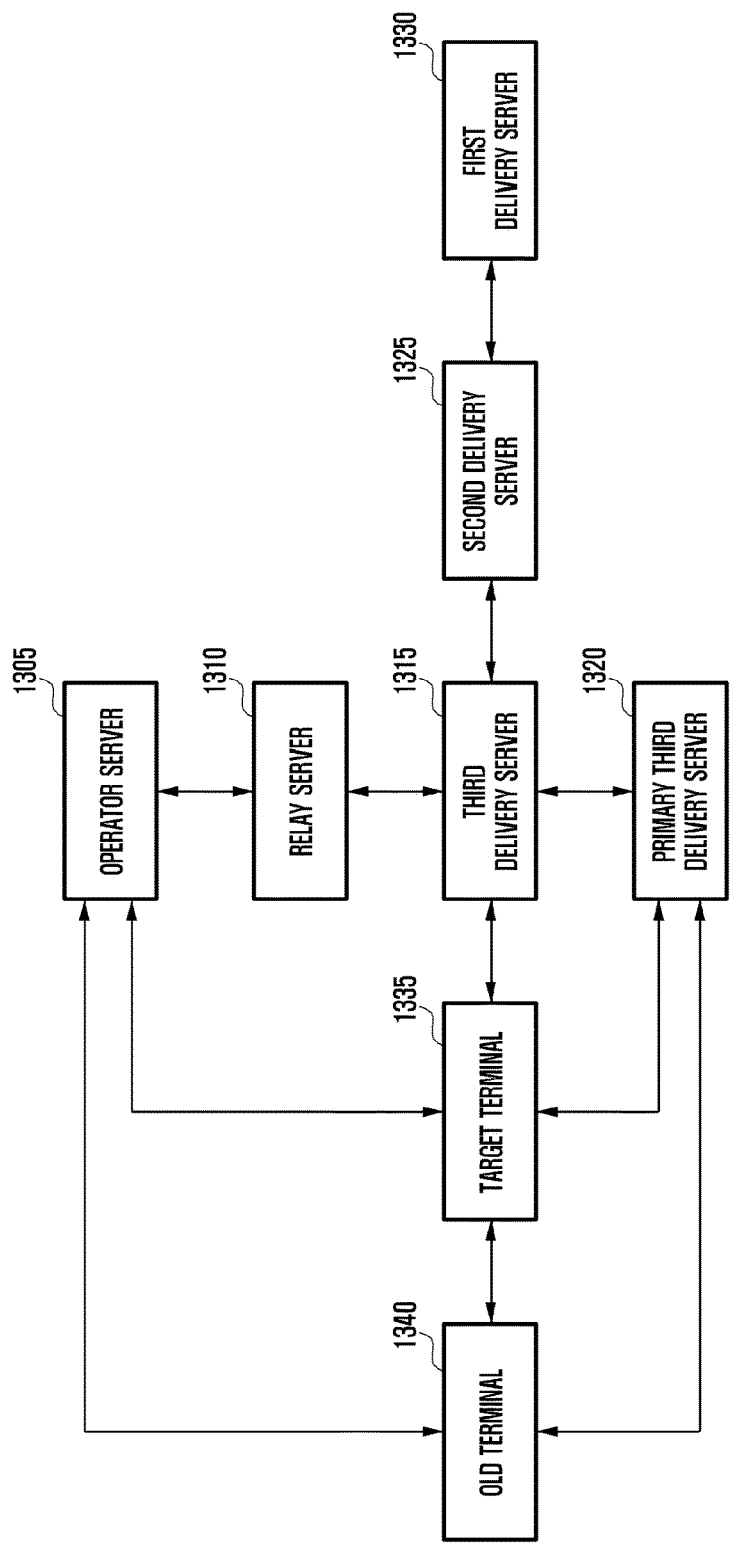
FIG. 13 is a block diagram illustrating a wireless communication system for remote download of a profile according to another embodiment of the present invention.

FIG. 13 is a block diagram illustrating a wireless communication system for remote download of a profile according to another embodiment of the present invention.

In reference to FIG. 13, at least one of an operator server 1305, a relay server 1310, a third delivery server 1315, a second delivery server 1325, a first delivery server 1330, an old terminal 1340, a target terminal 1335, and a Primary third delivery server 1320 may communicate signals with another entity. Although not shown in FIG. 7, the operator server 1350 may communicate with terminals 1335 and 1340 via an operator terminal.

FIG. 13 shows a network configuration for barring an access with the profile of the legacy terminal 1340 and permitting an access with the profile downloaded by means of the target terminal 1335. In detail, the old terminal 1340 acquires a profile from the network and performs communication based on the acquired profile, while the target terminal 1335 may be a terminal acquiring the profile after the legacy terminal 1340 has acquired the profile. The profile information may correspond to at least one of a contract code, a profile ID, a terminal-specific EID, and a Primary third delivery server. A more detailed description thereof is made hereinafter with reference to FIGS. 14A and 14B.

Figure 14A:
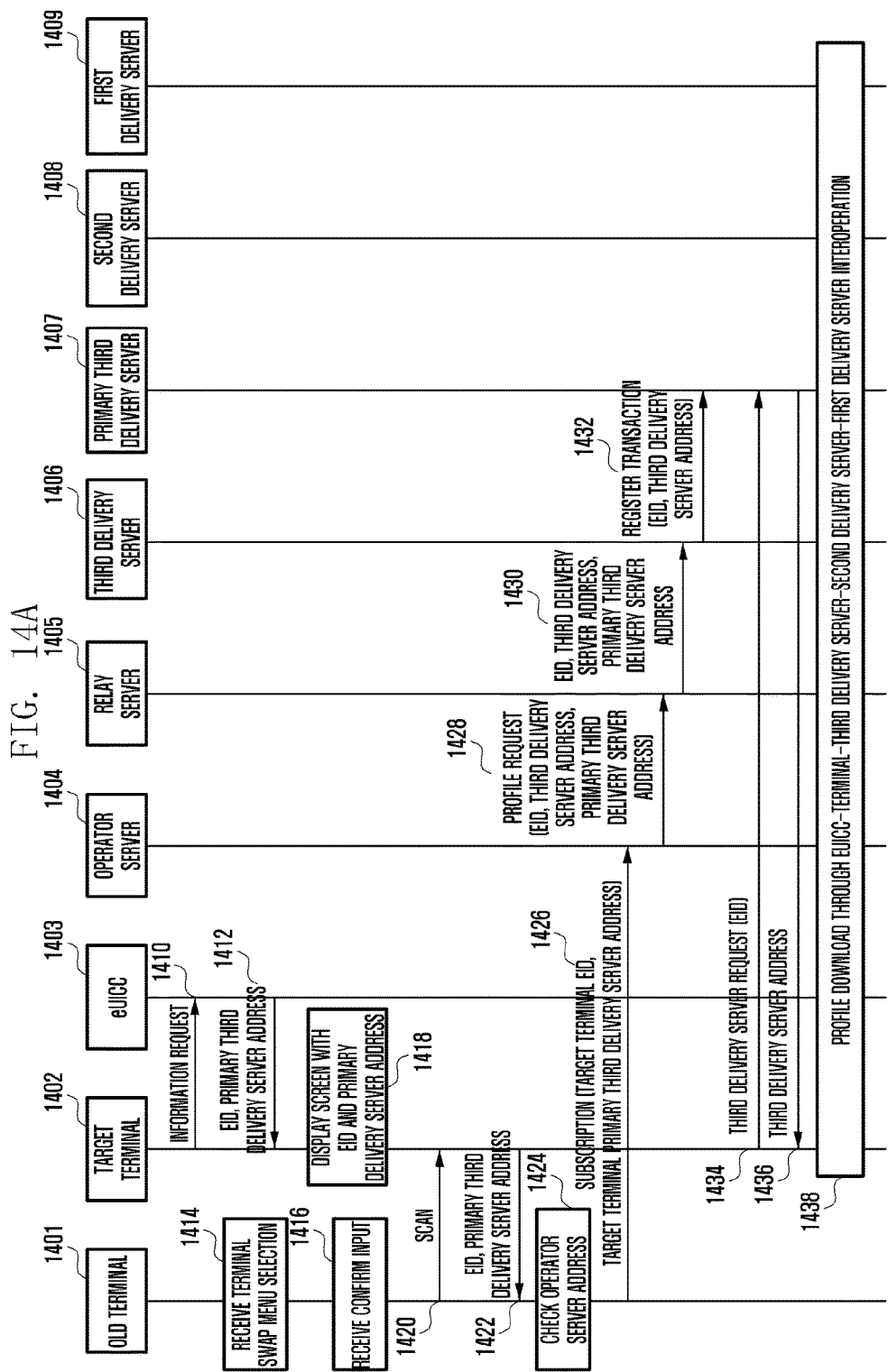
FIGS. 14A and 14B are signal flow diagrams illustrating procedures for swapping terminals while maintaining a contract according to another embodiment of the present invention.

FIG. 14A is signal flow diagram illustrating a procedure for swapping terminals while maintaining a contract according to another embodiment of the present invention.

In reference to FIG. 14A, at least one of an old terminal 1401, a target terminal 1402, an eUICC 1403, an operator server 1404, a relay server 1405, a third delivery server 1406, a Primary third delivery server 1407, a second delivery server 1408, and a first delivery server 1409 may communicate signals with another entity. In an embodiment, the eUICC 1403 may be installed in the target terminal 1402, and the controller of the target terminal 1402 may request to the eUICC 1403 for information and receive the information from the eUICC 1403.

The target terminal 1402 may transmit an information request message to the eUICC 1403 at step 1410 and receive a response message including the EID and Primary third delivery server address from the eUICC 1403 at step 1412. The target terminal 1402 may display the acquired EID and Primary third delivery server address on a display of the target terminal 1402 at step 1418. According to an embodiment, the above steps may be performed selectively.

The old terminal 1401 may, at step 1414, receive an input for selection of a menu item provided by the old terminal 1401 for swapping the old terminal 1401 for a new one while maintaining the current contract and may, at step 1416, receive an input for confirming the terminal swapping.

If the terminal swapping conformation menu item is selected, the old terminal 1401 may scan the screen of the target terminal 1402 by means of an input unit at step 1420 to acquire the ED and Primary third delivery server address at step 1422. The old terminal 1401 may acquire the above information through communication with the target terminal 1402.

The old terminal 1401 may check the contract code stored therein or received from a server or the previously stored information for the operator server address at step 1424 and establish a connection with the operator server 1404 using the operator server address.

Steps 1410 to 1424 may be performed in a different order or simultaneously.

The old terminal 1401 may transmit subscription information of the target terminal 1402 to the operator server 1404 at step 1426. The subscription information may include at least one of the EID of the target terminal 1402, a Primary third delivery server address of the target terminal 1402, a profile ID, and a contract code stored in the legacy terminal 1402. According to an embodiment, the EIDs of the old and target terminals 1401 and 1402 may be transmitted.

Although not shown in the drawing, instead of steps 1424 and 1426, it may be possible for the old terminal 1401 to transmit the EID and subscription information to the Primary third delivery server address stored in the terminal such that the Primary third delivery server 1407 extracts the operator information from the subscription information and establishes a connection with the operator server 1404 on behalf of the old terminal 1402 to transmit the EID and subscription information. Meanwhile, the operator server 1404 may receive the subscription information from the old terminal 1401 or the Primary third delivery server 1407 at step 1428 and block the access of the old terminal 1401 to the communication service. The step of blocking the access to the communication service may include updating the K value stored in the operator server 1404 to a new value. The operator server 1404 may perform the communication service update process in order for the target terminal 1402 to connect to the network and transmit a profile request including at least part of the subscription information and the third delivery server address to the relay server 1405. For example, the operator server 1404 transmits to the relay server 1405 the profile request including the EID, Primary third delivery server address, and third delivery server address. The third delivery server address may be the address of the third delivery server 1406 to which the target terminal 1402 has to connect for profile download.

The relay server 1405 may transmit to the third delivery server 1406 at least part of the received information. For example, the relay server 1405 may transmit to the third delivery server 1406 at least one of the EID, third delivery server address, and Primary third delivery server address.

The third delivery server 1406 may, at step 1432, transmit to the Primary third delivery server 1407 a transaction request including at least part of the received information. If the transaction registration request including at least one of the EID and third delivery server address is received from the third delivery server, the Primary third delivery server 1407 maps the EID and the third delivery server address and stores the mapping in a storage unit.

The target terminal 1402 may establish a connection with the Primary third delivery server 1407 based on the Primary third delivery server address set therein and, at step 1434, transmit to the Primary third delivery server 1407 a third delivery server address request message including the EID corresponding to the target terminal 1402.

The Primary third delivery server 1407 may check the ED-third delivery server address mapping information stored in a storage unit to retrieve the third delivery server address mapped to the EID and transmit the third delivery server address to the target terminal 1402 at step 1436, and the target terminal 1402 may establish a connection with the third delivery server 1406 with the third delivery server address and download the profile through the interoperation with the third delivery server at step 1348.

Figure 14B:
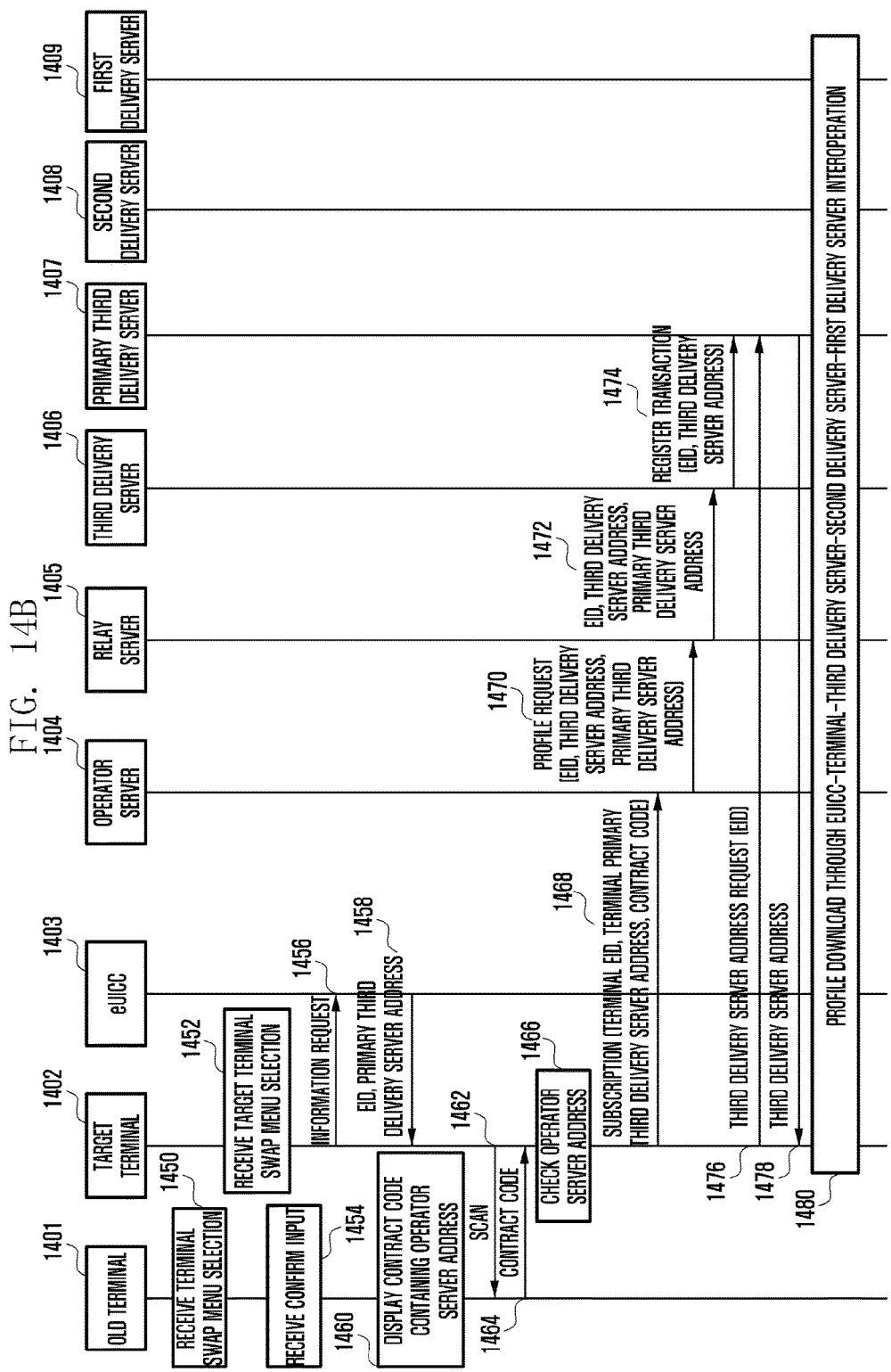

FIG. 14B is a signal flow diagram illustrating a procedure for swapping terminals while maintaining a contract according to another embodiment of the present invention.

In reference to FIG. 14B, at least one of an old terminal 1401, a target terminal 1402, an eUICC 1403, an operator server 1404, a relay server 1405, a third delivery server 1406, a Primary third delivery server 1407, a second delivery server 1408, and a first delivery server 1409 may communicate signals with another entity. According to an embodiment, the eUICC 1403 may be installed in the target terminal 1402, and a controller of the target terminal 1402 may request to the eUICC 803 for information and receive corresponding information.

In the embodiment of FIG. 14B, unlike the embodiment of FIG. 14A, the target terminal 1402 may directly establish a connection with the operator server 1404 to transmit subscription information.

For this purpose, the old terminal 1401 may provide a menu item for terminal swapping. If an input for selecting the menu item is received at step 1450, the old terminal 1401 may provide a menu item for confirming the terminal swapping. If an input for selecting the terminal swapping menu item is received at step 1454, the old terminal 1401 may display a contract code received from the operator server 1404 on its display. The contract code may include a communication server address information.

Also, the target terminal 1405 may provide the terminal swapping menu item on its screen and, if the swapping menu item is selected at step 1452, the target terminal 1402 may request to the UICC 1403 for information at step 1456 and receive the EID and Primary third delivery server address in reply at step 1458. At least one of the EID and Primary third delivery server address may be previously included in the target terminal 1402. The target terminal 1402 may scan the screen of the old terminal by means of an input unit at step 1462 to acquire the contract code of the old terminal 1401 at step 1464. The target terminal 1402 may acquire the contract code through communication with the old terminal 1401.

At step 1466, the target terminal 1402 may check the contract code stored therein or acquired from the operator server 1404 for an operator server address and establish a connection with the operator server 1404 using the operator server address.

The target terminal 1402 may transmit its subscription information to the operator server 1404 at step 1468. The subscription information may include at least one of the EID of the target terminal 1402, the Primary third delivery server address, and the contract code stored in the old terminal 1401.

Although not shown in the drawing, instead of steps 1466 and 1468, it may be possible for the target terminal 1402 to transmit the EID and subscription information to the Primary third delivery server address stored in the target terminal such that the Primary third delivery server extracts the operator information from the subscription information and establishes a connection with the operator server 1404 on behalf of the terminal target terminal 1402 to transmit the EID and subscription information. At step 1470, the operator server 1404 may receive the subscription information from the target terminal 1402 or the Primary third delivery server 1407 and block the access of the old terminal 1401 to the communication service. The step of blocking the access to the communication service may include updating the K value stored in the operator server 1404 to a new value. The operator server 1404 may perform the communication service update process in order for the target terminal 1402 to access a communication network and the operator server 1404 may transmit to the relay server 1405 a profile request including at least one of the EID, Primary third delivery server address, and third delivery server address received from the target terminal 1402. The third delivery server address may be the address of the third delivery server 1406 to connect for profile download.

At step 1472, the relay server 1405 may transmit to the third delivery server 1406 at least one of the EID, third delivery server address, and Primary third delivery server address received from the operator server 1404.

The third delivery server 1406 transmits to the Primary third delivery server 1407 a transaction registration request including the EID and third delivery server address at step 1474, and the Primary third delivery server 1470 maps the EID and the third delivery server address and stores the mapping in a storage unit.

The target terminal 1402 may establish a connection with the Primary third delivery server 1407 based on the Primary third delivery server address set therein and, at step 1476, transmit to the Primary third delivery server 1407 a third delivery server address request message including the EID.

The Primary third delivery server 1407 may check the ED-third delivery server address mapping information stored in a storage unit to retrieve the third delivery server address mapped to the EID and transmit the third delivery server address to the target terminal 1402, and the target terminal 1402 may establish a connection with the third delivery server 1406 with the third delivery server address at step 1478 and download the profile through the interoperation with the third delivery server at step 1480.

It is obvious that operation of each step in the procedures of FIGS. 14A and 14B can be applied to other embodiments.

Figure 15:
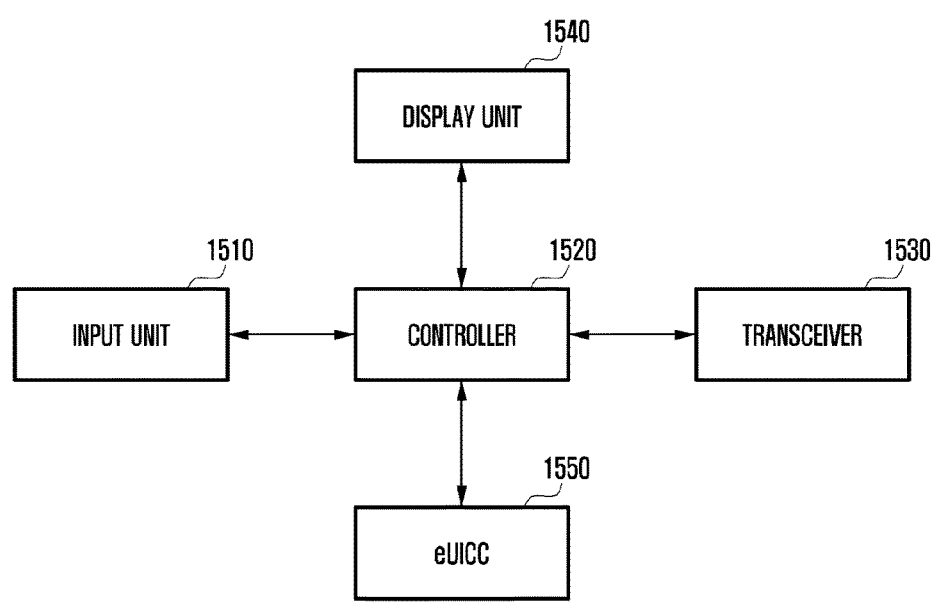
FIG. 15 is a block diagram illustrating a configuration of an old terminal or a target terminal according to an embodiment of the present invention.

FIG. 15 is a block diagram illustrating a configuration of an old terminal or a target terminal according to an embodiment of the present invention.

In reference to FIG. 15, each of the old and target terminals may include at least one of an input unit 1510 for receiving an input made by a user or received from a server and a display unit 1540 for displaying information. In the case of the old terminal, the terminal may receive the EID and Primary third delivery server address input by means of the input unit 1510 and display a contract code on the display unit 1540. In the case of the target terminal, it may receive the contract code of the old terminal that is input by means of the input unit 1510 and display the EID and Primary third delivery server address of the target terminal on the display unit 1540. Each terminal may include at least one of an eUICC 1550 for storing the EID and Primary third delivery server address and a transceiver 1530 for communicating information with the terminal and a server.

Each terminal may also include a controller 1520 for controlling the terminal operation according to an embodiment of the present invention. The controller 1520 may include at least one processor and control other components to accomplish the terminal operation according to an embodiment of the present invention.

According to an embodiment, the profile installed in a terminal may be deleted in various situations. For example, a profile of which subscription to the operator has expired may be deleted. In the case that the user is allowed to delete the profile from the terminal, the profile may be deleted by mistake and cause significant inconvenience; thus, there is a need of configuring a profile deletion policy rule in the eUICC. A description is made in detail hereinafter of the procedure for configuring a profile deletion policy rule in the eUICC and deleting the profile from the terminal based on the profile deletion policy rule.

Figure 16:
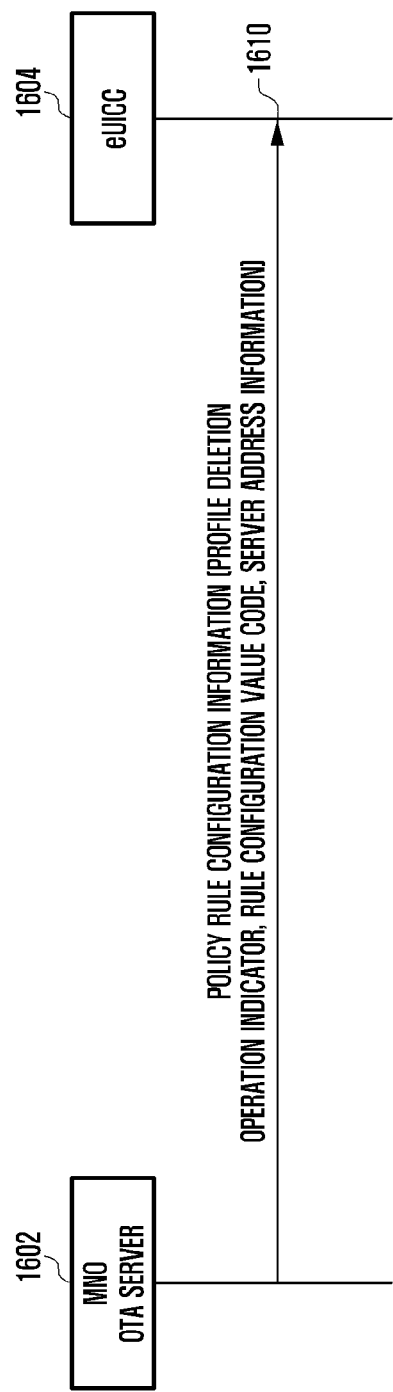
FIG. 16 is a signal flow diagram illustrating a procedure for downloading policy information to an eUICC according to an embodiment of the present invention.

FIG. 16 is a signal flow diagram illustrating a procedure for downloading policy information to an eUICC according to an embodiment of the present invention.

In reference to FIG. 16, a MNO Over-The-Air (MNO OTA) server 1602 and the eUICC 1604 may communicate signals.

In more detail, the MNO OTA server 1602 may transmit policy rule configuration information to the eUICC 1604 at step 1610. According to an embodiment, the policy rule configuration information may include at least one of a profile deletion operation identifier, a rule configuration value code, and server address.

According to an embodiment, the MNO may use the OTA server 1602 to install an applet or file in a UICC. In detail, the MNO may set up a profile-related policy rule in the eUICC 1604. According to an embodiment, the MNO OTA server 1602 may patch or update the information stored in the eUICC 1604. Also, the MNO OTA server 1602 sets up or updates an applet or file in the profile stored in the eUICC 1604. The profile deletion policy rule may include generating or updating one or more Elementary Files (EFs) in the profile. If a specific EF is designated, it may be possible to store the file using a SELECT command. It may be possible to update the designated EF using an UPDATE BINARY or UPDATE RECORD command. It may be possible to generate the EF using a CREATE FILE command.

In this case, the file may store the information as follows.

Profile Deletion Policy Rule Code value: This value may indicate profile information setup-related policy information and be set to 0, 1, 2, or 3. This code value may be interpreted in association with the eUICC as follows: (0: Deletion not allowed, 1: Deletion allowed, 2: Deletion allowed only with server authorization, 3: Deletion allowed only with user authorization).

Notification Server Address value: This value may include a URL or IP address server, which informs profile information setup-related operations.

Authorization Server information: This information may include an address of a server for authorizing the right of profile information setup-related operations. In detail, this information may include at least one of a storage address of an L3 server for authorizing the profile deletion right, L3 server and L2 server address values, and a public key of the right authorization server.

The terminal and the eUICC may operate as follows according to the Profile Deletion Policy Rule Code value stored in the EF.

Figure 17:
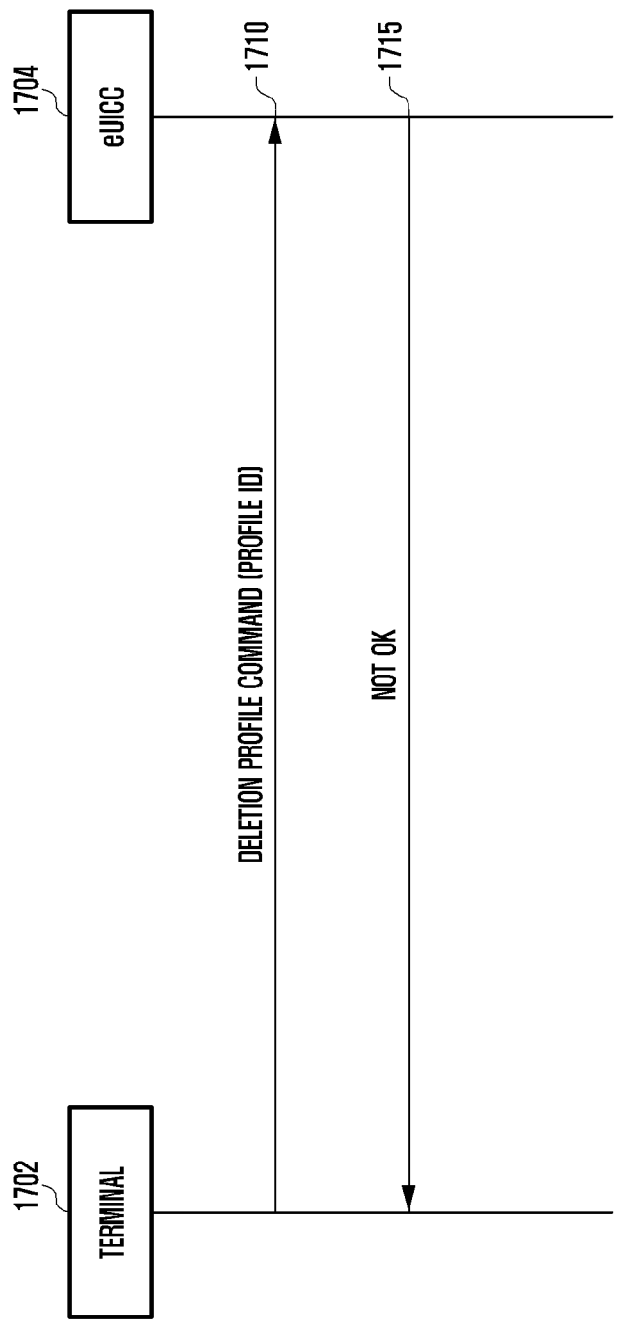
FIG. 17 is a signal flow diagram illustrating a profile deletion procedure according to an embodiment of the present invention.

FIG. 17 is a signal flow diagram illustrating a profile deletion procedure according to an embodiment of the present invention.

In reference to FIG. 17, the terminal 1702 and the eUICC 1704 may delete a specific profile through signal communication.

The embodiment of FIG. 17 is directed to the case where the Profile Deletion Policy Rule Code contained in the Profile is set to a value indicating "Deletion now allowed".

The terminal 1702 may transmit to the eUICC 1704, at step 1710, a message for deleting the profile. The profile deletion message may include the ID of the profile to delete (Profile ID). In detail, the terminal 1702 may transmit to the eUICC 1704 a Delete Profile Command in the form of an Application Protocol Data Unit (APDU) command. The Delete Profile Command may include the Profile ID.

The eUICC 1704 may check the received message and transmit a response message to the terminal 1702 in reply at step 1715. In detail, the eUICC 1704 transmits an error message to the terminal 1702 without deleting the profile because the Profile Deletion Policy Rule inside the profile in the eUICC corresponding to the Profile ID is set to "Deletion not allowed." The error message may be a "Not OK message." The error message may be a response message corresponding to the Delete Profile Command including a predetermined Status byte (SW1 or SW2) indicating the error.

Figure 18:
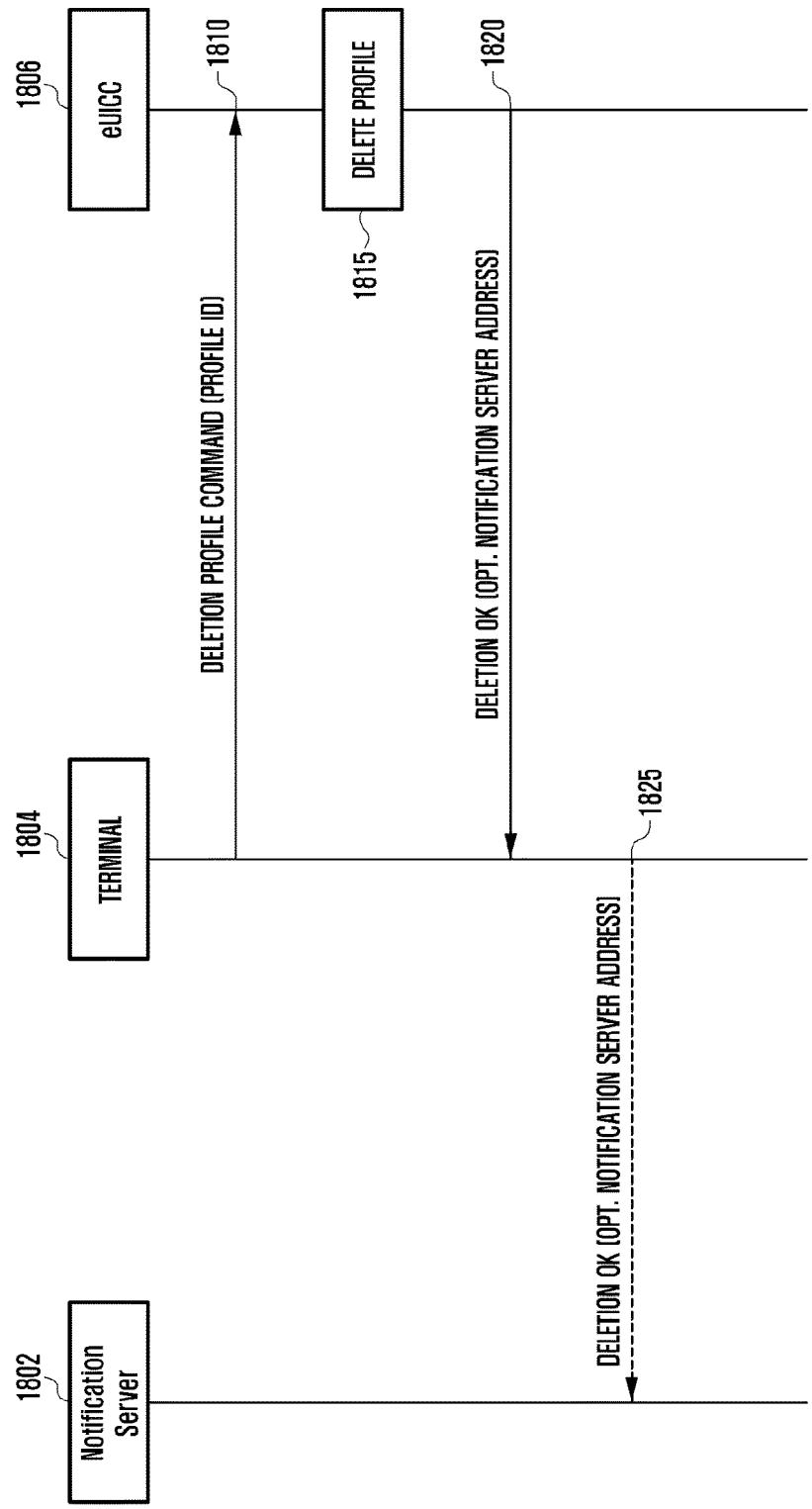
FIG. 18 is a signal flow diagram illustrating a profile deletion procedure according to another embodiment of the present invention.

FIG. 18 is a signal flow diagram illustrating a profile deletion procedure according to another embodiment of the present invention.

In reference to FIG. 18, a Notification Server 1802, a terminal 1804, and an eUICC 1806 may communicate signals therebetween. The embodiment of FIG. 18 is directed to the case where the Profile Deletion Policy Rule Code configured in the Profile is set to a value indicating "Deletion allowed." However, this embodiment may be applied to a case where the Profile Deletion Policy Rule Code is set to a different value.

The terminal 1804 may transmit a profile deletion message to the eUICC 1806 at step 1810. The profile deletion message may include an ID of the profile to delete (Profile ID). In detail, the terminal 1804 may transmit to the eUICC 1806 a Delete Profile Command in the form of an APDU command. The Delete Profile Command may include the Profile ID as a factor.

The eUICC 1806 may check the information on the profile identified based on the received message and perform an operation according to the check result at step 1815. In detail, the eUICC 1806 checks the Profile Deletion Policy Rule information included in the profile stored in the eUICC based on the Profile ID and performs an operation according to the check result. In this embodiment, the Profile Deletion Policy Rule for the profile identified based on the Profile ID is set to "Deletion allowed", and the eUICC 1806 may delete the profile identified by the Profile ID.

The eUICC 1806 may transmit a response message to the terminal 1804 at step 1820. In detail, the eUICC 1806 may transmit a Deletion OK message as the response message in reply to the APDU command. The Deletion OK message may be a Response message corresponding to the Delete Profile Command and include a predetermined Status byte (SW1 or SW2) to identify the Deletion OK. The response message may include the information on a notification server 1802 to which profile update is reported. In this embodiment, the information on the notification server 1802 may include the address of the server. The server address may be preconfigured and stored in the terminal 1804.

According to an embodiment, the terminal 1804 may transmit, at step 1825, to the notification server 1802 a message including the information indicating that a specific profile has been successfully deleted. In detail, if the EF corresponding to the Profile Deletion Policy Rule contained in the profile stored in the eUICC 1806 includes the notification server address, the eUICC 1806 may include the notification server address in the Deletion OK message being transmitted to the terminal 1804. The Deletion OK message may include a signature value encrypted with a private key stored in the eUICC 1806.

At step 1825, the terminal 1804 may transmit to the Notification server 1802 at least part of the information included in the Deletion OK message received from the eUICC 1806. In detail, if the information received at step 1820 includes a notification server address, the terminal 1804 may transmit the whole or part of the information included in the Deletion OK message to the Notification server 1802 identified by the notification server address.

According to an embodiment, the terminal 1804 may transmit to the Notification server 1802 the information related to the profile deletion result based on the message received from the eUICC 1806 regardless of a specific profile deletion result.

Figure 19:
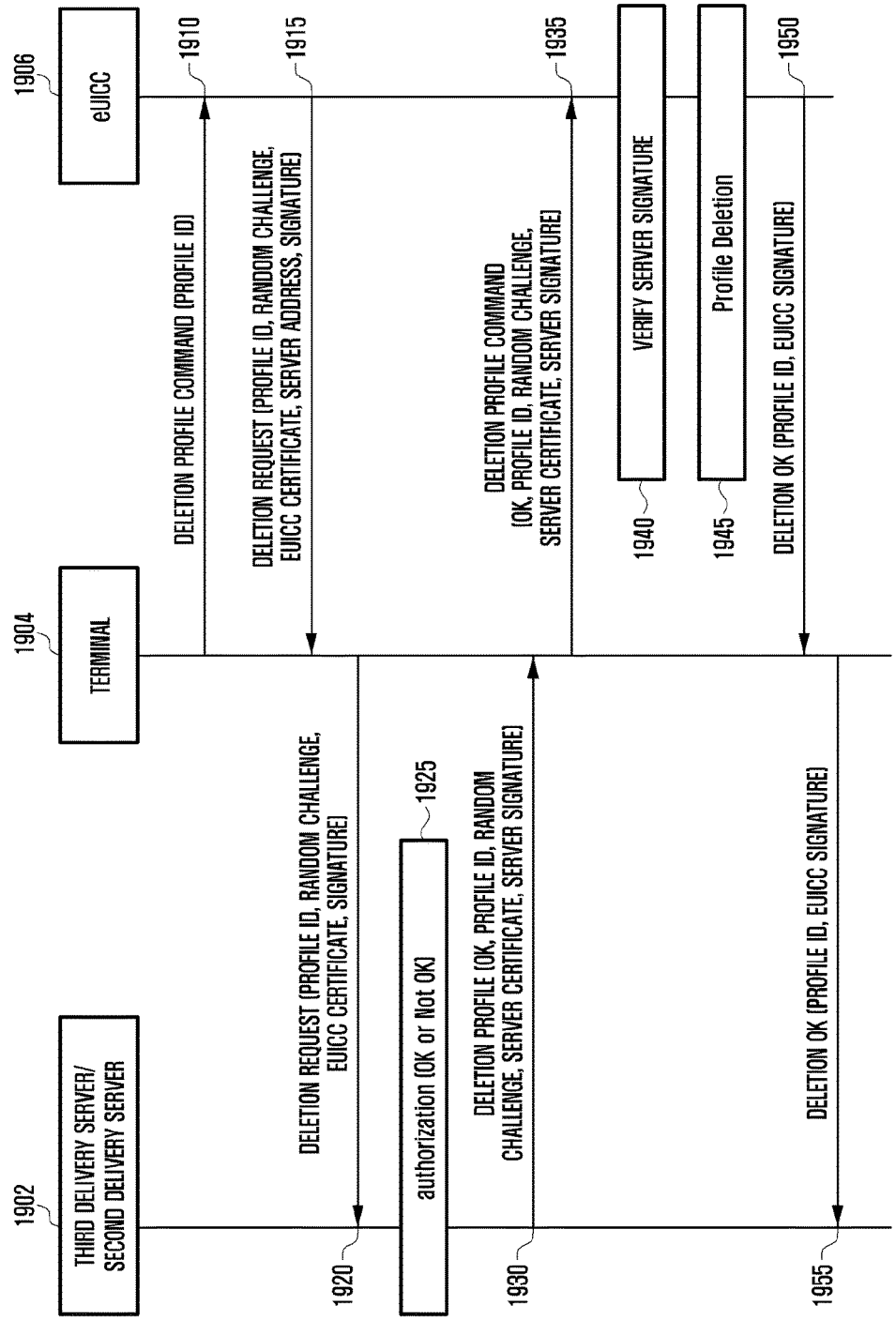
FIG. 19 is a signal flow diagram illustrating a profile deletion procedure according to an embodiment of the present invention.

FIG. 19 is a signal flow diagram illustrating a profile deletion procedure according to an embodiment of the present invention.

In reference to FIG. 19, a third/second delivery server 1902, a terminal 1904, and an eUICC 1906 may communicate messages for deleting a profile. According to an embodiment, the third/second delivery server 1902 may be formed as logically separate nodes in a single server and referred to just as third delivery server.

This embodiment is directed to the case where the Profile Deletion Policy Rule Code contained in the Profile as a deletion target is set to a value indicating "Deletion allowed only with server authorization". The technical features of this embodiment may be applicable to the case where the code is set to a different value.

The terminal 1904 may transmit a profile deletion message to the eUICC 1906 at step 1910. The profile deletion message may include the ID of the profile as a deletion target (Profile ID). In detail, the terminal 1904 may transmit to the eUICC 1906 the Delete Profile Command in the form of an APDU command. The Delete Profile Command may include a Profile ID.

The eUICC 1906 may check the information on the profile identified based on the received message and perform an operation according to the check result at step 1915. In detail, the eUICC 1906 may transmit to the terminal 1904 a message for triggering a related operation for the case where the Profile Deletion Policy Rule for the Profile ID is set to "Deletion allowed only with server authorization". In more detail, the eUICC 1906 may transmit to the terminal 1904 a Deletion Request message including a random challenge value, an eUICC certificate or a public key, and a signature for use by an external server with right authorization. In more detail, the Deletion Request message may include at least one of a corresponding Profile ID, generated random challenge, eUICC certificate, server address, and signature encrypted in the eUICC 1906. The Deletion Request message may be a response message corresponding to the Delete Profile Command and include a predetermined Status byte (SW1 or SW2) to identify the information related to the Deletion Request. The Deletion Request message may include the address of a server for performing authorization on the Profile Deletion as part of the EF value corresponding to the Profile Deletion Policy Rule contained in the profile in the eUICC. According to an embodiment, the random challenge may be referred to just as challenge.

If the Deletion Request message is received, the terminal 1904 may transmit, at step 1920, the whole or part of the information included in the Deletion Request message to the third delivery server 1902 identified by the server address. According to an embodiment, a third delivery server address may be included in the received message or pre-stored in the terminal 1904. According to an embodiment, the terminal 1904 may check the message received at step 1915 for the server address and transmit to the server identified by the server address a message including part or all of the information contained in the Deletion Request message. The server identified by the server address may be the third delivery server 1902.

The third delivery server 1902 may determine at step 1925 whether it can delete the profile based on the received message. In detail, the third delivery server 1902 may check the Deletion Request message to determine whether it can delete the profile identified by the profile ID included therein and perform a right authentication process based on a preconfigured value or information received from an external server. Here, the third delivery server 1902 may check at least part of the information included in the received message to verify the Deletion Request message and determine whether it is possible to delete the profile based on at least one of the eUICC certificate and signature value included in the message.

If it is determined at step 1925 that the third delivery server 1902 can delete the profile, the third delivery server 1902 may generate and transmit a Delete Profile (OK) message to the terminal 1904 at step 1930. The Delete Profile (OK) message may include at least one of the Profile ID, random challenge, third delivery server certificate or public key, and signature value. This message may also include an authorization success indicator (e.g., OK). According to an embodiment, the Delete Profile (OK) message may include at least one of an OK indicator, a Profile ID, a random challenge, a third delivery server public key, a third delivery server signature value, a second delivery server public key, and a second delivery server signature value. In this case, the third delivery server 1902 may transmit the Deletion Request message to the second delivery server such that both the second and third delivery servers perform the profile deletion authorization in a distributed manner.

At step 1935, the terminal 1904 may transmit to the eUICC 1906 at least part of the information included in the Delete Profile (OK) message received from the terminal 1904.

The eUICC 1906 may verify at least one of the random challenge value and server signature value included in the message at step 1940; delete, if the values are successfully verified, the profile at step 1945; and transmit a Delete OK message to the terminal 1904 at step 1950. According to an embodiment, the Deletion OK message may be a response message corresponding to the Delete Profile Command and include a predetermined Status byte (SW1 or SW2) value for identifying the Deletion OK message. The Deletion OK message may include a signature encrypted with the private key stored in the eUICC 1906.

The terminal 1904 may, at step 1955, transmit to the third delivery server 1902 a message including the whole or part of the information included in the Deletion OK message.

Figure 20:
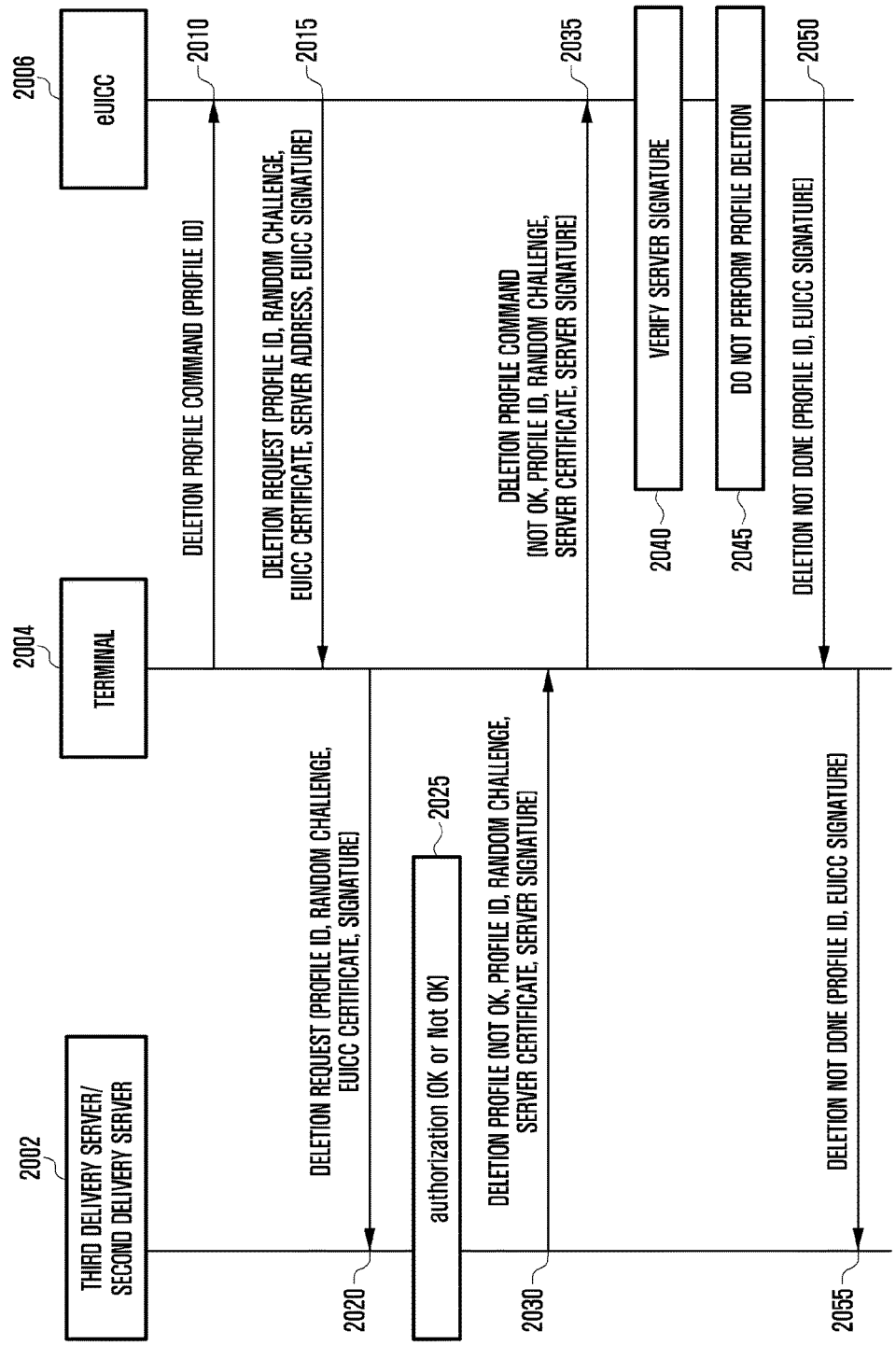
FIG. 20 is a signal flow diagram illustrating a profile deletion procedure according to another embodiment of the present invention.

FIG. 20 is a signal flow diagram illustrating a profile deletion procedure according to another embodiment of the present invention.

In reference to FIG. 20, a third/second delivery server 2002, a terminal 2004, and an eUICC 2006 may communicate messages for deleting a profile. According to an embodiment, the third/second delivery server 2002 may be formed as logically separate nodes in a single server and referred to just as third delivery server.

Although this embodiment is directed to the case where the Profile Deletion Policy Rule Code configured in the Profile as a deletion target is set to a value indicating "Deletion allowed only with server authorization", the code value may include the information related to the signal transmitted/received when the third delivery server 2002 fails authorization. The technical features of this embodiment may be applicable to the case where the code is set to a different value. However, the technical features of this embodiment may be applicable in a similar way to the case where the code is set to another value or the authorization result at third delivery server 2002 is different.

The terminal 2004 may transmit a profile deletion message to the eUICC 2006 at step 2010. The profile deletion message may include the ID of the profile as an identifier of the profile to be deleted (Profile ID). In detail, the terminal 2004 may transmit to the eUICC 2006 the Delete Profile Command in the form of an APDU command. The Delete Profile Command may include a Profile ID.

The eUICC 2006 may check the information on the profile identified based on the received message and perform an operation according to the check result at step 2015. In detail, the eUICC 2006 may transmit to the terminal 2004 a message for triggering a related operation for the case where the Profile Deletion Policy Rule for the Profile ID is set to "Deletion allowed only with server authorization". In more detail, the eUICC 2006 may transmit to the terminal 2004 a Deletion Request message including a random challenge value, an eUICC certificate or public key, and a signature for use by an external server with right authorization. In more detail, the Deletion Request message may include at least one of a corresponding Profile ID, generated random challenge, eUICC certificate, server address, and signature encrypted in the eUICC 2006. The Deletion Request message may be a response message corresponding to the Delete Profile Command and include a predetermined Status byte (SW1 or SW2) to identify the information related to the Deletion Request. The Deletion Request message may include the address of a server for performing authorization on the Profile Deletion as part of the EF value corresponding to the Profile Deletion Policy Rule contained in the profile in the eUICC.

If the Deletion Request message is received, the terminal 2004 may transmit, at step 2020, the whole or part of the information included in the Deletion Request message to the third delivery server 1902 identified by the server address. According to an embodiment, a third delivery server address may be included in the received message or pre-stored in the terminal 2002. According to an embodiment, the terminal 2004 may check the message received at step 2015 for the server address and transmit to the server identified by the server address a message including part or all of the information contained in the Deletion Request message. The server identified by the server address may be the third delivery server 2002.

The third delivery server 2002 may determine, at step 2015, whether it can delete the profile based on the received message. In detail, the third delivery server 2002 may check the Deletion Request message to determine whether it can delete the profile identified by the profile ID included therein and perform a right authentication process based on a preconfigured value or information received from an external server. Here, the third delivery server 2002 may check at least part of the information included in the received message to verify the Deletion Request message and determine whether it is possible to delete the profile based on at least one of the eUICC certificate and signature value included in the message.

If it is determined that the third delivery server 2002 can delete the profile, the third delivery server 2002 may generate and transmit a Delete Profile (Not OK) message to the terminal 2004 at step 2030. The Delete Profile (Not OK) message may include at least one of the Profile ID, random challenge, third delivery server certificate or public key, signature value, and an authorization failure indicator (e.g., Not OK).

According to an embodiment, the Delete Profile (Not OK) message may include at least one of a Not OK indicator, a Profile ID, a random challenge, a third delivery server public key, a third delivery server signature value, a second delivery server public key, and a second delivery server signature value. In this case, the third delivery server 2002 may transmit the Deletion Request message to the second delivery server such that both the second and third delivery servers perform the profile deletion authorization in a distributed manner.

At step 2035, the terminal 2004 may transmit to the eUICC 2006 at least part of the information included in the Delete Profile (Not OK) message received from the terminal 2004.

The eUICC 2006 may verify at least one of the random challenge value and server signature value included in the message at step 2040; skip, at step 2015, if the values are successfully verified, executing the Profile Deletion command based on the received information; and transmit a Deletion Not Done message to the terminal 2004 at step 2050. According to an embodiment, the Deletion Not Done message may be a response message corresponding to the Deletion Profile Command message and include one of Status bytes (SW1 and SW2) for identifying the Deletion Not Done message. The Deletion Not Done message may include a signature encrypted with the private key stored in the eUICC 2006. According to an embodiment, if it is determined that the profile deletion is not allowed based on the information included in the message received from the third delivery server 2002, it may be possible to update the Profile Deletion operation indicator stored in the eUICC 2006 with the information received from the third delivery server 2002.

The terminal 2004 may, at step 2055, transmit to the third delivery server 2002 a message including the whole or part of the information included in the Deletion Not Done message.

Figure 21:
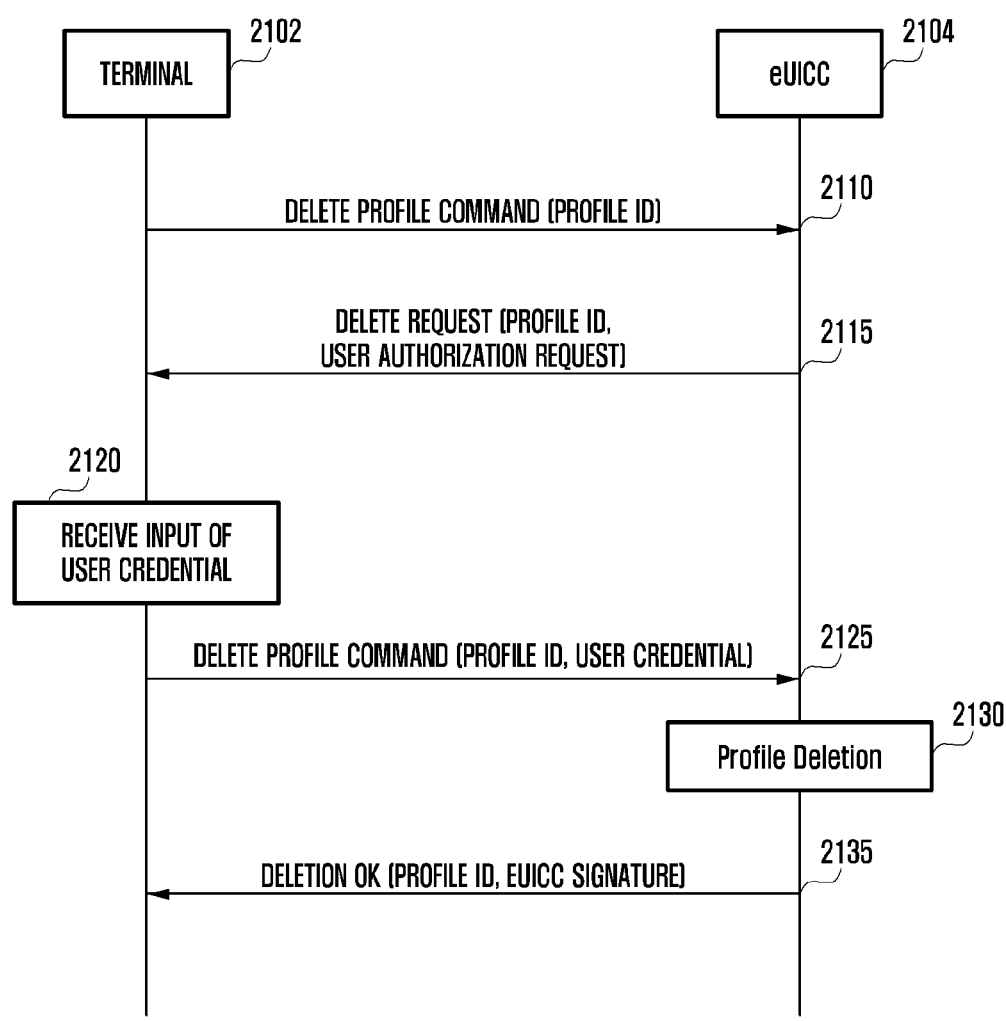
FIG. 21 is a signal flow diagram illustrating a profile deletion procedure according to another embodiment of the present invention.

FIG. 21 is a signal flow diagram illustrating a profile deletion procedure according to another embodiment of the present invention.

In reference to FIG. 21, a terminal 2102 and an eUICC 2104 may communicate signals for deleting a certain profile. In this embodiment, it may be possible to delete a profile by entering a User Credential. Although this embodiment is directed to the case where the Profile Deletion Policy Rule Code contained in the profile is set to a value indicating "Deletion allowed only with user authorization", the features of the present invention are applicable in a similar way to other cases.

The terminal 2102 may, at step 2110, transmit to the eUICC 2104 a message for deleting the profile. The profile deletion message may include an ID of the profile as a target of deletion. In detail, the terminal 2102 may transmit to the eUICC 2104 a Delete Profile Command in the form of an APDU command. The Delete Profile Command may include the Profile ID.

The eUICC 2104 may check the received message and transmit a response message to the terminal 2102 in reply at step 2115. In detail, if Profile Deletion Policy Rule configured in the profile identified by the Profile ID in the eUICC 2104 is set to a value indicating "Deletion allowed only with user authorization", the eUICC 2104 may transmit to the terminal 2102 a Deletion Request message for authorization. The Deletion Request message may include an indicator indicating necessity of User authorization and information on the type of User Credential. For example, the User Credential may include a Personal Identification Number (PIN), a Password, and fingerprint information. The User Credential may be included in the eUICC 2104 or a separate storage device. The User Credential may be contained in the profile in the form of a file and generated and updated by an OTA of the operator as described with reference to FIG. 16 or may be stored in the eUICC or separate storage device in such a way that the user enters an APDU command into the terminal 2102. Although this embodiment is directed to the case where the User Credential is stored in the eUICC 2104 for convenience of explanation, it is obvious that the technical feature of the present invention is applicable to other cases.

The terminal 2102 may collect information related to a User Credential based on the information included in the received message at step 2120. In detail, the terminal 2102 may display the information indicating the necessity of the User Credential on the display, i.e., the terminal 2102 may display a screen prompting the user to enter the User Credential. The terminal 2102 may receive the User Credential, which the user enters by means of an input unit of the terminal 2102. The User Credential may include at least one of a user ID, a password (or PIN), and a fingerprint.

The terminal 2102 may transmit to the eUICC 2104 a Delete Profile Command including the User Credential at step 2125. The User Credential may include a PIN or Password or a hash value thereof. If the User Credential is a fingerprint or other biometric authentication information, it is converted into a value capable of being verified and then contained in the Delete Profile Command being transmitted to the eUICC 2102.

The eUICC 2104 may compare the User Credential contained in the Delete Profile Command and the User credential stored in the eUICC 2104 and, if the User Credentials match, delete the profile at step 2130.

The eUICC 2104 may transmit a Deletion OK message to the terminal 2102 at step 2135. If the User Credentials do not match, the eUICC 2104 may transmit a Deletion Not OK message to the terminal 2102.

Figure 22:
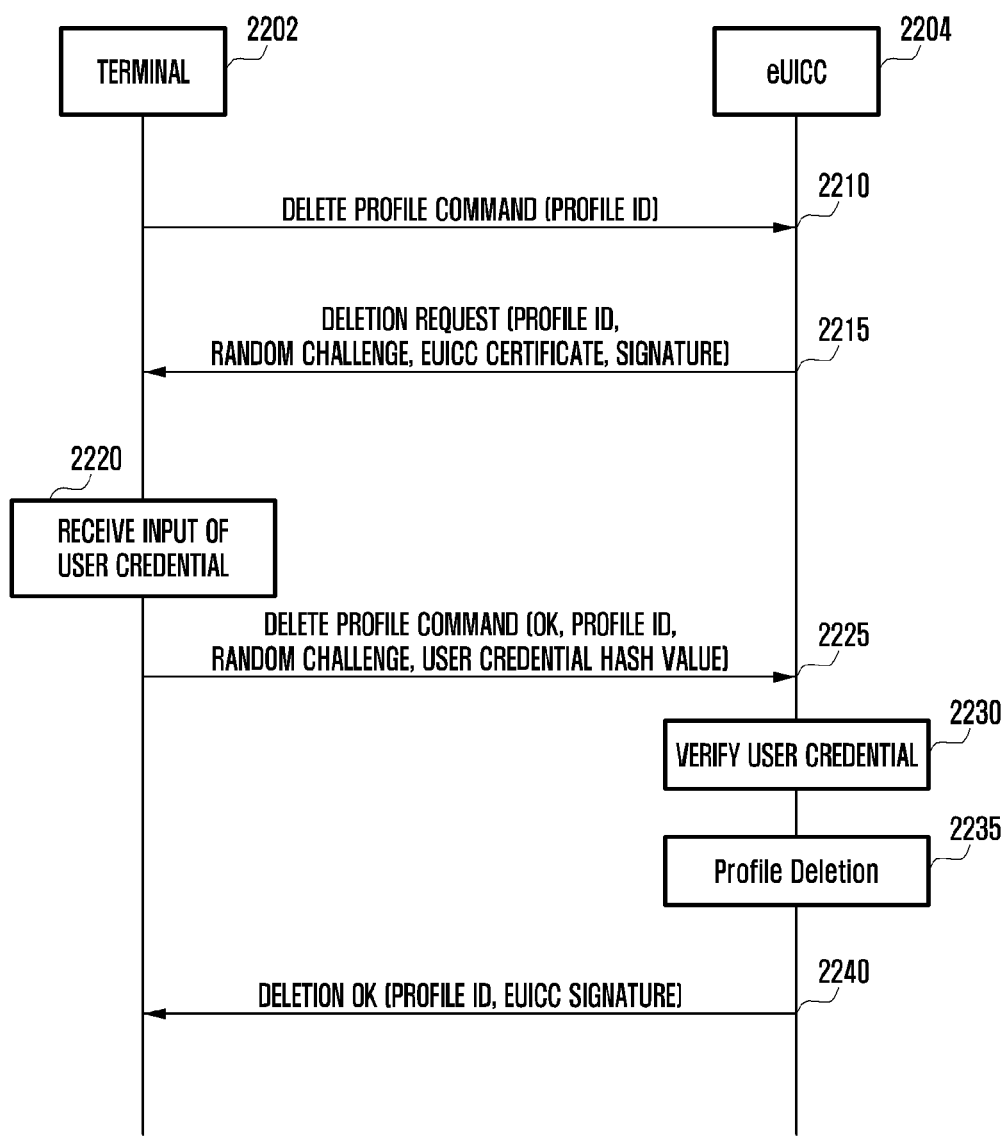
FIG. 22 is a signal flow diagram illustrating a profile deletion procedure according to another embodiment of the present invention.

FIG. 22 is a signal flow diagram illustrating a profile deletion procedure according to an embodiment of the present invention.

In reference to FIG. 22, a terminal 2202 and an eUICC 2204 may communicate signals for deleting a certain profile. In this embodiment, it may be possible to delete a profile by entering a User Credential. This embodiment is directed to the case where the Profile Deletion Policy Rule Code contained in the profile is set to a value indicating "Deletion allowed only with user authorization".

The terminal 2202 may transmit to the eUICC 2204 a message for deleting the profile at step 2210. The profile deletion message may include an ID of the profile as a target of deletion. In detail, the terminal 2202 may transmit to the eUICC 2204 a Delete Profile Command in the form of an APDU command. The Delete Profile Command may include the Profile ID.

The eUICC 2204 may check the received message and transmit a response message to the terminal 2202 in reply at step 2215. In detail, if Profile Deletion Policy Rule configured in the profile identified by the Profile ID in the eUICC 2204 is set to a value indicating "Deletion allowed only with user authorization", the eUICC 2204 may transmit to the terminal 2202 a Deletion Request message for authorization. The Deletion Request message may include an indicator indicating necessity of User authorization, information on the type of User Credential, and a random challenge value for replay attack protection. The User Credential may include a PIN, a Password, and fingerprint information. The User Credential may be included in the eUICC 2204 or a separate storage device. The information to be included in the Deletion Request message may be selectively determined. The UCredential may be contained in the profile in the form of a file and generated and updated by an OTA of the operator as described with reference to FIG. 16 or may be stored in the eUICC 2204 or in a separate storage device in such a way that the user enters an APDU command into the terminal 2202. Although this embodiment is directed to the case where the User Credential is stored in the eUICC 2204 for convenience of explanation, it is obvious that the technical feature of the present invention is applicable to other cases.

The terminal 2202 may collect information related to a User Credential based on the information included in the received message at step 2220. In detail, the terminal 2202 may display the information indicating the necessity of the User Credential on the display, i.e., the terminal 2202 may display a screen prompting the user to enter the User Credential. The terminal 2202 may receive the User Credential that the user enters by means of an input unit of the terminal 2202.

The terminal 2202 may transmit to the eUICC 2204 a Delete Profile Command including the User Credential at step 2225. The delete Profile Command may include information generated based on at least one of the random challenge value and User Credential information received from the eUICC 2204, e.g., a hash value generated based on at least part of the received information. If the User Credential is a fingerprint or other biometric authentication information, such information is converted into a value capable of being verified and then contained in the Delete Profile Command being transmitted to the eUICC 2202. In the case of using the biometric authentication information, the random challenge value may be used as a factor of a function of processing the biometric authentication information.

The eUICC 2204 may compare the User Credential contained in the Delete Profile Command and the User Credential stored in the eUICC 2204 at step 2230 and, if the User Credentials match, delete the profile at step 2235 and transmit a Deletion OK message to the terminal 2202 at step 2240. If the User Credentials do not match, the eUICC 2204 may transmit a Deletion Not OK message to the terminal 2202.

In the case of a terminal equipped with an eUICC, it may be necessary to perform a factory reset on the terminal in various situations such as device repair and swapping at a customer center. In this case, it may be necessary to initialize the profile and settings stored in the eUICC. The settings may include an eUICC platform Policy Rule. The eUICC platform Policy Rule may be a Policy Rule that is not included in the profile and that is stored in an eUICC Issuer Security Domain-Root (ISD-R) region, an eUICC Profile Manager region, or an eUICC OS region.

According to an embodiment, it may be possible to configure whether the eUICC factory reset can be performed with a Manufacturer Credential or a User Credential using the eUICC platform Policy Rule.

Figure 23:
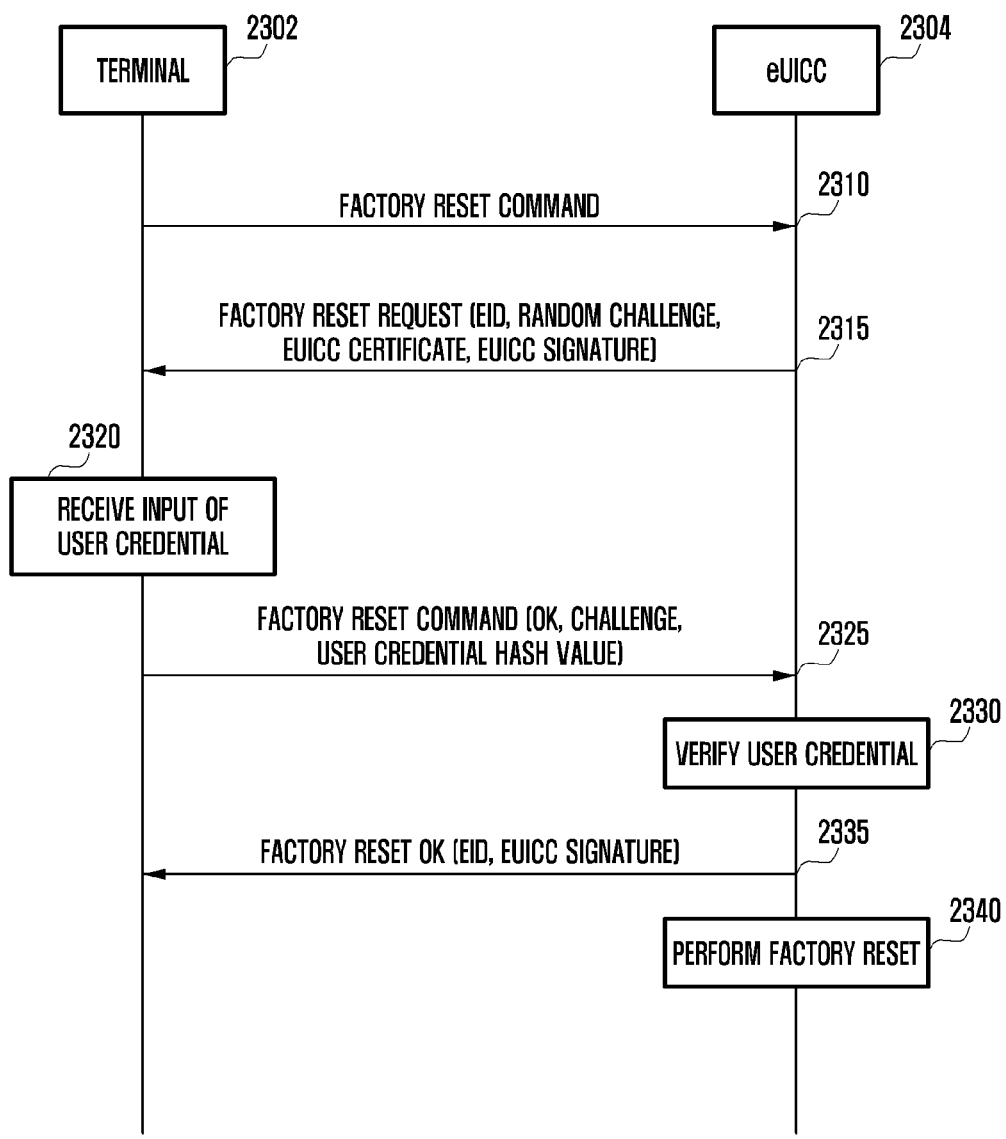
FIG. 23 is a signal flow diagram illustrating a factory reset procedure according to an embodiment of the present invention.

FIG. 23 is a signal flow diagram illustrating a factory reset procedure according to an embodiment of the present invention.

In reference to FIG. 23, a terminal 2302 and an eUICC 2304 communicate signals for a factory reset. In detail, FIG. 23 shows a factory reset procedure of a case where a platform Policy Rule stored in the eUICC 2304 is configured to allow factory reset with a User Credential.

The terminal 2302 transmits a Factory Reset Command to the eUICC 2304 at step 2310. The Factory Reset Command may include an identifier for identifying the eUICC 2304, e.g., EID.

The eUICC 2304 may transmit to the terminal 2302 a Factory Reset Request message for additional authentication at step 2315. According to an embodiment, the Factory Reset Request message may include at least one of the EID, random challenge value generated by the eUICC 2304, eUICC certificate, and eUICC signature. The Factory Reset Request message may be a response message transmitted in reply to the Factory Reset Command. The response message may be identified as the Factory Reset Request message by means of one of Status bytes (SW1 and SW2) included therein. The Factory Reset Request message may include at least one of an indicator indicating necessity of a User Credential and an indicator indicating the type of the User Credential.

Although this embodiment is directed to the case where the type of User Credential is set to a value indicating User Password, the technical features of the present invention are applicable in a similar way to other cases.

If it is identified that the User Credential type included in the Factory Reset Command is set to the value indicating User Password, the terminal 2302 may display a screen prompting entry of the User Password on its display and receive the User Credential at step 2320. The user may input the password by means of an input unit of the terminal 2302. The User Credential for factory reset may be collected in other ways.

The terminal 2302 may transmit to the eUICC 2304 the Factory Reset Command generated based on the received information at step 2325. The Factory Reset Command may include part or all of the information (including challenge value) generated by the eUICC 2304 and a hash value calculated with the User Password as an additional factor. The Factory Reset Command may include authentication information rather than calculated hash value.

The eUICC 2304 may check the Factory Reset Command to verify the hash value with the User Password stored in its storage at step 2330.

If the User Credential verification succeeds, the eUICC 2304 transmits a Factory Reset OK message to the terminal 2302 at step 2335. If the User Credential verification fails, the eUICC 2304 transmits a Factory Reset Not OK message to the terminal 2302. One of the Factory Reset OK and Factory Reset Not OK messages is transmitted as a response message corresponding to the Factory Reset Command. The response message may be identified as the Factory Reset OK or Factory Reset Not OK message by means of one of the Status bytes (SW1 and SW2) included therein.

In the case that the User Credential verification succeeds, the eUICC 2304 may perform factory reset at step 2340. According to an embodiment, the Factory Reset OK message may be transmitted after the eUICC 2304 has completed the factory reset process. In this case, the eUICC 2304 may continue to hold the information for use in transmitting the Factory Reset OK message after completing the factory reset.

According to an embodiment, the terminal 2302 may include the User Credential in the Factory Reset Command, and the eUICC 2304 may verify the User Credential to perform factory reset only when factory reset is allowed.

Figure 24:
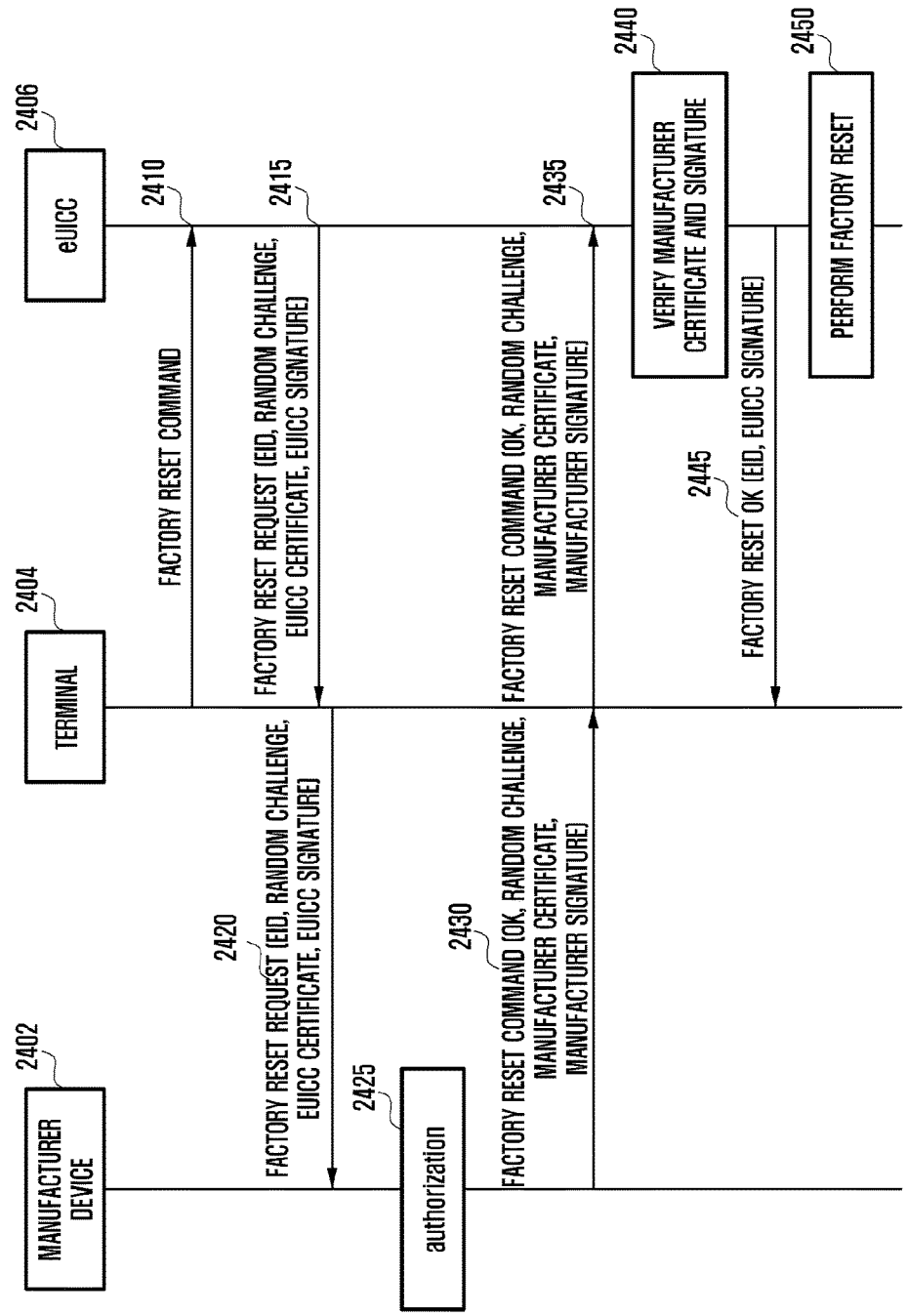
FIG. 24 is a signal flow diagram illustrating a factory reset procedure according to another embodiment of the present invention.

FIG. 24 is a signal flow diagram illustrating a factory reset procedure according to another embodiment of the present invention.

In reference to FIG. 24, a manufacturer device 2402, a terminal 2404, and an eUICC 2406 may communicate signals for a factory reset. In detail, FIG. 24 shows a factory reset procedure for a case where a platform Policy Rule stored in the eUICC 2404 is configured to allow factory reset with a terminal manufacturer credential. In this embodiment, the manufacturer device 2402 may be a host device associated with the terminal 2404 or a mobile operator and entrusted to guarantee reliability of a factory reset process.

First, the terminal 2404 generates a Factory Reset Command to the eUICC 2406.

The terminal 2404 may transmit the Factory Reset Command to the eUICC 2406 at step 2410. The Factory Reset Command may include an identifier for identifying the eUICC 2406, e.g., EID.

The eUICC 2406 may transmit to the terminal 2404 a Factory Reset Request message for additional authentication at step 2415. According to an embodiment, the Factory Reset Request message may include at least one of the EID, a random challenge value generated by the eUICC 2406, an eUICC certificate, and an eUICC signature. The Factory Reset Request message may be a response message transmitted in reply to the Factory Reset Command. The response message may be identified as the Factory Reset Request message by means of one of Status bytes (SW1 and SW2) included therein. The Factory Reset Request message may also include an indicator indicating the necessity of the terminal manufacturer credential. This indicator may be defined separately or be analogized from one of the Status bytes (SW1 and SW2). The manufacturer credential may be a manufacturer certificate or a private key corresponding thereto.

The terminal 2404 may transmits the Factory Reset Request message to the manufacturer device 2402 at step 2420. The terminal 2404 and the manufacturer device 2402 may communicate signals through a wired or wireless connection such as a Universal Serial Bus (USB) connection, Serial connection, Bluetooth connection, and Wi-Fi connection.

The manufacturer device 2402 may verify the eUICC signature included in the Factory Reset Request message for authorization at step 2425. The manufacturer device 2402 may perform authorization on the Factory Reset Request with various means such as IP/PW or RFID assigned to service center staff If the authorization succeeds, the manufacturer device 2402 may transmit to the terminal 2404, at step 2430, a Factory Reset Command including a signature value acquired by encrypting the challenge value included in the Factory Reset Request message and part or all of the information included in the Factory Reset Command with a private key corresponding to the manufacturer certificate. The Factory Reset Command may include the manufacturer certificate. The Factory Reset Command may also include a high level certificate of the manufacturer certificate. Examples of the certificate may include at least one of all certificates belonging to the certificate chain including the manufacturer certificate with the exception of the highest root certificate. The Factory Reset Command may further include an OK indicator indicating that factory reset is allowed.

If the Factory Reset Command is received from the manufacturer device 2402, the terminal 2404 may transmit, at step 2435, a Factory Reset Command including part or all of the information included in the Factory Reset Command message received from the manufacturer device 2402.

The eUICC 2406 may perform authorization on the Factory Reset Request at step 2440 based on at least part of the received information. Meanwhile, the eUICC 2406 may store the highest root certificate or public key. The root certificate or public key may be used to verify the manufacturer certificate included in the Factory Reset Command received from the terminal 2404. If the manufacturer certificate is valid, the eUICC 2406 may check the challenge values included in the manufactured certificate and Factory Reset Command for verification of the signature value.

If the verification succeeds, the eUICC 2406 transmits a Factory Reset OK message to the terminal 2404 at step 2445. Otherwise if the verification fails, the eUICC 2406 transmits a Factory Reset Not OK message to the terminal 2404. One of the Factory Reset OK and Factory Reset Not OK messages is transmitted as a response message corresponding to the Factory Reset Command. The response message may be identified as the Factory Reset OK or Factory Reset Not OK message by means of one of the Status bytes (SW1 and SW2) included therein.

In the case that the verification succeeds, the eUICC 2406 may perform the factory reset at step 2450. According to an embodiment, the Factory Reset OK message may be transmitted after completing the factory reset. In this case, the eUICC 2406 has to continue holding the information for use in transmitting the Factory Reset OK message during the factory reset.

In addition to the function for initializing all the information stored in the eUICC, such as the Factory Reset function, there may be a need of a function for deleting a specific profile. In detail, it may be necessary to make it possible to delete a profile regardless of the profile deletion indicator of the corresponding profile.

Figure 25:
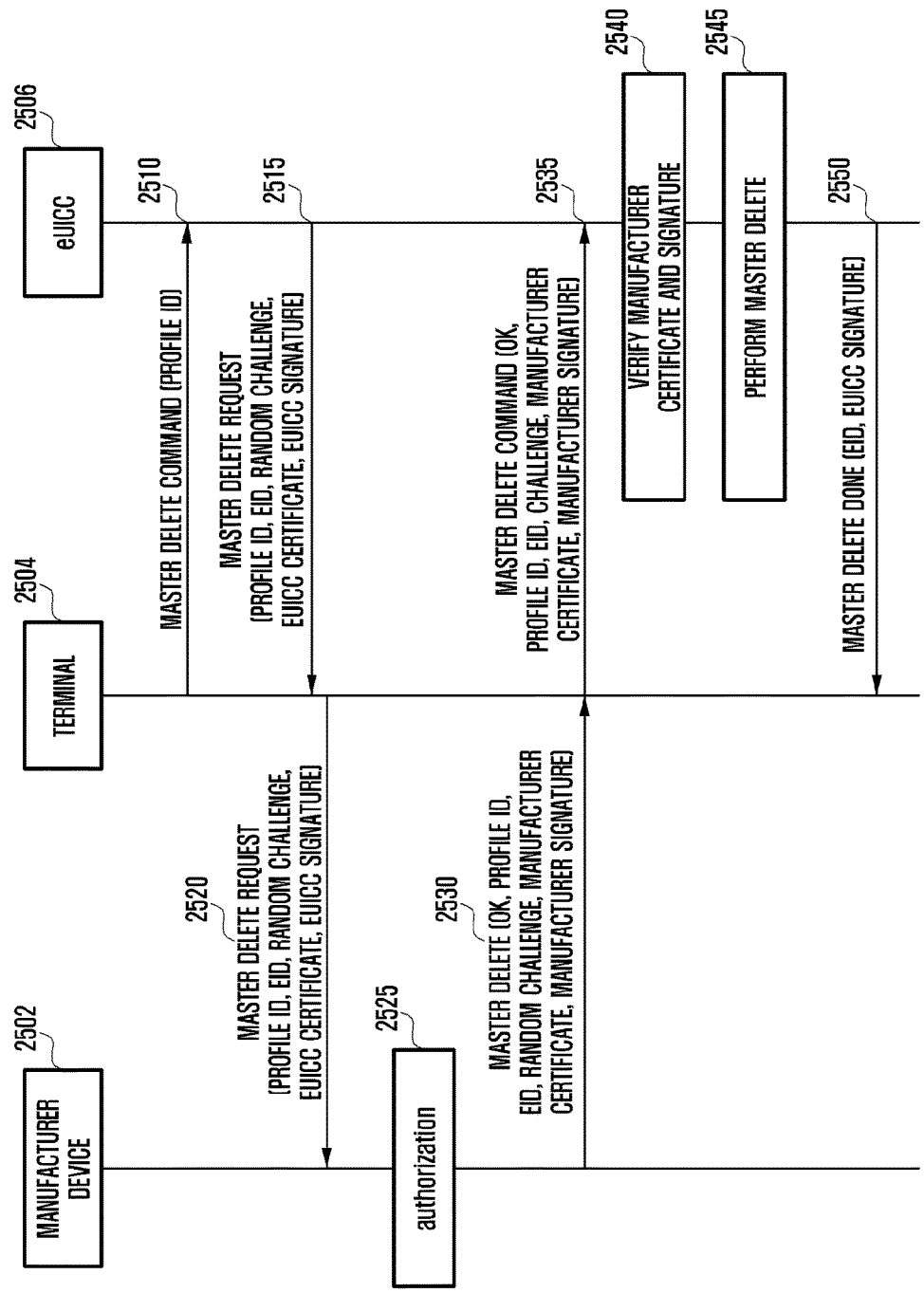
FIG. 25 is a signal flow diagram illustrating a Master Delete Procedure according to an embodiment of the present invention.

FIG. 25 is a signal flow diagram illustrating a Master Delete Procedure according to an embodiment of the present invention.

In reference to FIG. 25, a manufacturer device 2502, a terminal 2504, and an eUICC 2506 may communicate signals for Master Delete. In this embodiment, the Master Delete Procedure is performed using the terminal manufacturer credential.

The terminal 2504 transmits a Master Delete Command message to the eUICC 2506 at step 2510. The Master Delete Command message may include a Profile ID for identifying the profile as a target for deletion.

The eUICC 2506 may transmit a Master Delete Request message to the terminal 2504 for authorization at step 2515. The Master Delete Request message may include at least one of the profile ID, EID, random challenge value generated in the eUICC 2506, eUICC certificate, and eUICC signature. The Master Delete Request message may be a response message corresponding to the Master Delete Command. The response message may include an SW value for use in identifying the Master Delete Request message. The Master Delete Request message may include an indicator indicating the necessity of a terminal manufacturer credential. This indicator may be transmitted separately or derived from one of the Status bytes (SW1 and SW2). The manufacturer credential may be a manufacturer certificate or a private key corresponding thereto.

The terminal 2504 may transmit the Master Delete Request message to the manufacturer device 2502 at step 2520. The terminal 2504 and the manufacturer device 2502 may communicate signals through a wired or wireless connection such as a Universal Serial Bus (USB) connection, Serial connection, Bluetooth connection, and Wi-Fi connection.

The manufacturer device 2502 may verify the eUICC signature contained in the Master Delete Request at step 2525. The manufacturer device 2502 may perform authorization on the Master Delete Request with various means such as IP/PW or RFID assigned to service center staff.

If the authorization succeeds, the manufacturer device 2502 may transmit to the terminal 2504, at step 2530, a Master Delete Command including a signature value acquired by encrypting the challenge value included in the Master Delete Request and part or all of the information contained in the Master Delete Command with a private key corresponding to the manufacturer certificate. The Master Delete Command may include the manufacturer certificate. The Master Delete Command may also include a high-level certificate of the manufacturer certificate. Examples of the certificate may include at least one of all certificates belonging to the certificate chain including the manufacturer certificate with the exception of the highest root certificate.

The Master Delete Command may further include an OK indicator indicating that the Master Delete is allowed.

If the Master Delete Command is received from the manufacturer device 2502, the terminal 2504 may transmit to the eUICC 2506 a Master Delete Command including part or all of the information contained in the received Master Delete Command at step 2535.

The eUICC 2506 may perform authorization on the Master Delete Request at step 2540 based on at least part of the received information. Meanwhile, the eUICC 2506 may store the highest root certificate or public key. The root certificate or public key may be used to verify the manufacturer certificate included in the Master Delete Command received from the terminal 2504. If the manufacturer certificate is valid, the eUICC 2506 may check the challenge values included in the manufacturer certificate and Master Delete Command for verification of the signature value.

If the verification succeeds, the eUICC 2506 deletes, at step 2545, the profile identified by the Profile ID contained in the Master Delete Command and transmits a Master Delete Done message to the terminal 2504 at step 2550. If the verification fails, the eUICC 2506 may transmit a Master Delete Failed message to the terminal 2504. One of the Master Delete Done and Master Delete Failed messages is transmitted as a response message corresponding to the Master Delete Command. The response message may be identified as the Master Delete Done Master Delete Failed message by means of one of the Status bytes (SW1 and SW2) included therein.

The methods specified in the claims and specification can be implemented by hardware, software, or a combination of them.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods disclosed in the claims and specifications of the present invention.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other type of optical storage device, and a magnetic cassette. It may also be possible to store the program in a memory device implemented in combination of part or all of the aforementioned media. The storage unit may include a plurality of memories.

The program may be stored in an attachable storage device accessible through a communication network implemented as a combination of Internet, intranet, Local Area Network (LAN), Wireless LAN (WLAN), and Storage Area Network (SAN). The storage device may be attached to the device performing the methods according to embodiments of the present invention by means of an external port. It may also be possible for a separate storage device installed on a communication network to attach to the device performing the methods according to embodiments of the present invention.

In the embodiments of the present invention, the components are described in singular or plural forms depending on the embodiment. However, the singular and plural forms are selected appropriately for the proposed situation just for explanatory convenience without any intention of limiting the present invention thereto; thus, the singular form includes the plural forms as well, unless the context clearly indicates otherwise. Although the embodiments have been described independently, the present invention includes a combination of two or more embodiments.

The embodiments of the present invention may be implemented in the form of computer-readable codes in a computer-readable recording medium. The computer-readable recoding medium may be a data storage device capable of storing data readable by a computer system. Examples of the computer-readable recording medium include Read-Only Memory (ROM), a volatile or non-volatile memory, Compact Disc (CD) ROM, a magnetic tape, a floppy disk, an optical data storage device, and a carrier wave (such as data transmission through the Internet). The functional programs, codes, and code segments for accomplishing the present invention can be easily interpreted by programmers skilled in the art.

The apparatuses and methods specified in the embodiments of the present invention can be implemented by hardware, software, or a combination of them. A software-implemented apparatus or method can be stored in machine-readable (computer-readable) optical or magnetic storage medium (regardless of being erasable or rewritable) such as volatile or non-volatile memory storage devices including ROM, RAM, memory chip, device-type or integrated circuit memory, CD, DVD, magnetic disk, and magnetic tape. The methods according to the embodiments of the present invention can be implemented with a computer or a portable terminal equipped with a controller and a memory or a network entity such as a server managed by a communication operator in a wireless communication system; the memory is a machine-readable storage medium capable of storing a program comprised of instructions or programs for implementing the embodiments of the present invention.

Accordingly, the embodiments of the present invention include the programs comprised of the codes for implementing the apparatuses or methods specified in the claims and the machine-readable (computer-readable) storage media storing such programs.

According to an embodiment of the present invention, a remote profile download method of a terminal in a wireless communication system may include communication between a terminal and a first delivery server with a profile encryption function, a second delivery server with a profile retransmission control function, and a third delivery server with a profile installation authentication function.

According to an embodiment of the present invention, a terminal for downloading a profile remotely in a wireless communication system includes a transceiver for communicating data through a wireless network, an eUICC, a controller for controlling installation of the profile in the eUICC through a connection established with a third delivery server, and a storage device for storing data input through the transceiver and a process result of the controller.

In a wireless communication system of an embodiment of the present invention, a first delivery server includes a transceiver for communication with a second delivery server, a controller for encrypting a profile, and a storage unit for storing the encrypted profile.

In a wireless communication system of an embodiment of the present invention, the second delivery server includes a transceiver for communication with a first delivery server and a third delivery server, a controller for controlling profile reinstallation, and a storage unit for storing data input through the transceiver and processing results of the controller.

In a wireless communication system of an embodiment of the present invention, a third delivery server includes a transceiver for communication with a second delivery server and a terminal, a controller for performing authentication for profile installation and authorization on installation request, and a storage unit for storing data input through the transceiver and processing results of the controller.

In a wireless communication system according to another embodiment of the present invention, a method for activating a terminal equipped with an eUICC at an office of an agent of a mobile operator includes acquiring, at the terminal, an eUICC identifier (or EID) and a Primary third delivery server address from the eUICC; scanning, at an operator terminal, a screen of the terminal for the eUICC identifier and Primary third delivery server address; transmitting the eUICC identifier and Primary third delivery server address to an operator server; transmitting the eUICC identifier and Primary third delivery server address and a third delivery server address from the operator server to a relay server; transmitting the eUICC identifier and Primary third delivery server address from the relay server to a third delivery server identified by the third delivery server address; transmitting the eUICC identifier and the third delivery server address from the third delivery server to a Primary third delivery server identified by the Primary third delivery server address; mapping, at the Primary third delivery server, the eUICC identifier and third delivery server address and storing the mapping; transmitting the eUICC identifier from the terminal to the Primary third delivery server; retrieving, at the Primary third delivery server, the mapping between the eUICC identifier and third delivery server address based on the eUICC identifier to acquire the third delivery server address; transmitting the third delivery server address from the Primary third delivery server to the terminal; downloading, at the terminal, a profile from the third delivery server identified by the third delivery server address; and installing the profile.

In a wireless communication system according to another embodiment of the present invention, a terminal equipped with an eUICC and performing a remote profile download at an office of an agent of an operator includes a transceiver for communicating data through a wireless network; an eUICC; a controller for controlling acquisition of an eUICC identifier and a Primary third delivery server address from the eUICC, acquisition of an address of a third delivery server through a connection established with the Primary third delivery server, and installation of the profile received through the connection established with the third delivery server corresponding to the third delivery server address in the eUICC; a display unit for displaying the acquired eUICC identifier and Primary third delivery server address; and a storage unit for storing data input through the transceiver and processing results of the controller.

In a wireless communication system of another embodiment of the present invention, an operator terminal for activating a terminal equipped with an eUICC in an office of an agent of an operator includes an input unit for receiving an input of an eUICC identifier and a Primary third delivery server address and a transceiver for transmitting the eUICC identifier and Primary third delivery server address to an operator server.

In a wireless communication system according to another embodiment of the present invention, an operator server for activating a terminal equipped with an eUICC in an office of an agent of an operator includes a transceiver for communication with an operator terminal and a relay server; a controller for controlling the transceiver to transmit to the relay server an eUICC identifier, a third delivery server address, and a Primary third delivery server address received from the operator terminal; and a storage unit for storing data input through the transceiver and processing results of the controller.

In a wireless communication system of another embodiment of the present invention, a relay server for activating a terminal equipped with an eUICC in an office of an agent of an operator includes a transceiver for communication with an operator server and a third delivery server and a controller for controlling the transceiver to transmit an eUICC identifier, a third delivery server address, and a Primary third delivery server address to the third delivery server.

In a wireless communication system according to another embodiment of the present invention, a third delivery server for activating a terminal equipped with an eUICC in an office of an agent of an operator includes a transceiver for communication with a relay server, a Primary third delivery server and the terminal, a controller for controlling the transceiver to transmit an eUICC identifier to the Primary third delivery server identified by a Primary third delivery server address received from a relay server, and a storage unit for storing data input through the transceiver and processing results of the controller.

In a wireless communication system according to another embodiment of the present invention, a Primary third delivery server for activating a terminal equipped with an eUICC in an office of an agent of an operator includes a transceiver for communication with the third delivery server and a terminal, a controller for mapping an eUICC identifier and a third delivery server address received from a third delivery server and controlling the transceiver to transmit the eUICC identifier to the Primary third delivery server identified by the Primary third delivery server address received from the third delivery server in response to a request for the third delivery server address using the eUICC identifier by the terminal, and a storage unit for storing data input through the transceiver and processing results of the controller.

In a wireless communication system of another embodiment of the present invention, a method for activating a terminal equipped with an eUICC includes acquiring, by a terminal, an operator server address, transmitting an eUICC identifier and a Primary third delivery server address from the terminal to the operator server, and transmitting the eUICC identifier and the Primary third delivery server address from the operator server to a relay server.

In a wireless communication system of another embodiment of the present invention, a terminal equipped with an eUICC that performs a remote profile download for activation thereof includes a controller for controlling acquisition of an operator server address and transmission of an eUICC identifier and a Primary third delivery server address to an operator server.

In a wireless communication system of another embodiment of the present invention, an operator server in a method for activating a terminal equipped with an eUICC includes a controller for controlling transmission of an eUICC identifier and a Primary third delivery server address received from the terminal to a relay server.

In a wireless communication system according to another embodiment of the present invention, a method for swapping an old terminal for a target terminal while maintaining a communication service contract includes storing, at the old terminal, a contract code; displaying, at the target terminal, a QR code containing an eUICC identifier of the target terminal and a Primary third delivery server address; scanning, at the old terminal, the QR code to acquire the eUICC identifier of the target terminal and Primary third delivery server address; transmitting the eUICC identifier, the Primary third delivery server address, and the contract code from the old terminal to the operator server; deactivating, at the operator server, a network access function of the profile stored in the old terminal using the contract code; and transmitting the eUICC identifier and Primary third delivery server address from the operator server to a relay server.

In a wireless communication system according to another embodiment of the present invention, a method for swapping an old terminal for a target terminal while maintaining a communication service contract includes displaying, at the old terminal, a screen prompting confirmation of transfer of the contract from the old terminal to the target terminal; displaying, at the old terminal when an input for confirming the transfer is received, a QR code including a contract code containing an operator server address; scanning, at the target terminal, the QR code; acquiring, at the target terminal, an eUICC identifier and a Primary third delivery server address from an eUICC of the target terminal; transmitting the contract code of the old terminal and the eUICC identifier and Primary third delivery server address of the target terminal to the operator server identified by the operator server address contained in the contract code acquired from the QR code; deactivating, at the operator server, a network access function of the profile stored in the old terminal with the contract code received from the target terminal; and transmitting the eUICC identifier of the target terminal and Primary third delivery server address from the operator server to the relay server.

Although the description has been made with reference to particular embodiments, the present invention can be implemented with various modifications without departing from the scope of the present invention. Thus, the present invention is not limited to the particular embodiments disclosed, and it will include the following claims and their equivalents.

What is claimed is:

1. A method for managing information by a universal integrated circuit card (UICC) in a mobile communication system, the method comprising:
   receiving a command for deleting information associated with the UICC;
   transmitting, to a device for verification, a request message including an identifier of the UICC, a random challenge value, and a first signature value;
   receiving, from the device for verification, if a verification for the first signature value succeeds in the device for verification, a response message including a second signature value generated based on the random challenge value and certificate information associated with the device for verification;
   verifying the certificate information associated with the device for verification based on a public key or a highest root index stored in the UICC; and
   deleting at least one information associated with the UICC based on the response message if the verification succeeds.

2. The method of claim 1, wherein the command includes a profile identifier to be deleted in the UICC.

3. The method of claim 1, wherein the request message includes at least one of a certificate associated with the UICC and an indicator requesting certificate information associated with the device for verification.

4. The method of claim 1, wherein the device for verification corresponds to a manufacture server for a terminal including the UICC.

5. The method of claim 1,
   wherein the second signature value includes the random challenge value included in the request message and information included in the command.

6. A method for managing information by a device for verification in a mobile communication system, the method comprising:
   receiving, from a universal integrated circuit card (UICC), a request message including an identifier of the UICC, a random challenge value, and a first signature value based on a command associated with the UICC;

verifying the first signature value included in the request message; and transmitting, to the UICC, if a verification for the first signature value succeeds, a response message including a second signature value generated based on the random challenge value and certificate information associated with the device for verification, wherein at least one information associated with the UICC is deleted based on the response message.

7. The method of claim 6, wherein the command includes a profile identifier to be deleted in the UICC.

8. The method of claim 6, wherein the request message includes at least one of a certificate associated with the UICC and an indicator requesting certificate information associated with the device for verification.

9. The method of claim 6, wherein the device for verification corresponds to a manufacture server for a terminal including the UICC.

10. The method of claim 6, wherein the second signature value includes the random challenge value included in the request message and information included in the command.

11. A universal integrated circuit card (UICC) in a mobile communication system, the UICC comprising:

a transceiver; and at least one processor coupled with the transceiver and configured to:

receive a command for deleting information associated with the UICC, transmit, to a device for verification, a request message including an identifier of the UICC, a random challenge value, and a first signature value, receive, from the device for verification, if a verification for the first signature value succeeds in the device for verification, a response message including a second signature value generated based on the random challenge value and certificate information associated with the device for verification, verify the certificate information associated with the device for verification based on a public key or a highest root index stored in the UICC; and delete at least one information associated with the UICC based on the response message if the verification succeeds.

12. The UICC of claim 11, wherein the command includes a profile identifier to be deleted in the UICC.

13. The UICC of claim 11, wherein the request message includes at least one of a certificate associated with the UICC and an indicator requesting certificate information associated with the device for verification.

14. The UICC of claim 11, wherein the device for verification corresponds to a manufacture server for a terminal including the UICC.

15. The UICC of claim 11, wherein the second signature value includes the random challenge value included in the request message and information included in the command.

16. A device for verification in a mobile communication system, the device comprising:

a transceiver; and at least one processor coupled with the transceiver and configured to:

receive, from a universal integrated circuit card (UICC) a request message including an identifier of the UICC, a random challenge value, and a first signature value based on a command associated with the UICC, verify the first signature value included in the request message, and transmit, to the UICC, if a verification for the first signature value succeeds, a response message including a second signature value generated based on the random challenge value and certificate information associated with the device for verification, wherein at least one information associated with the UICC is deleted based on the response message.

17. The device of claim 16, wherein the command includes a profile identifier to be deleted in the UICC.

18. The device of claim 16, wherein the request message includes at least one of a certificate associated with the UICC and an indicator requesting certificate information associated with the device for verification.

19. The device of claim 16, wherein the device for verification corresponds to a manufacture server for a terminal including the UICC.

20. The device of claim 16, wherein the second signature value includes the random challenge value included in the request message and information included in the command.

* * * * *